(12) United States Patent
Kallfass et al.

(10) Patent No.: US 9,196,902 B2
(45) Date of Patent: Nov. 24, 2015

(54) PHOSPHATE- AND SILICATE-BASED ELECTRODE MATERIALS, MORE PARTICULARLY FOR LITHIUM ION BATTERIES AND LITHIUM CAPACITORS

(75) Inventors: Christoph Kallfass, Schwaebisch Hall (DE); Hermann Schier, Stuttgart (DE)

(73) Assignee: Max-Planck-Gesellschaft zur Foerderung der Wissenschaften e. V., Munich (DE)

(*) Notice: Subject to any disclaimer, the term of this patent is extended or adjusted under 35 U.S.C. 154(b) by 0 days.

(21) Appl. No.: 13/807,752

(22) PCT Filed: Jul. 4, 2011

(86) PCT No.: PCT/EP2011/003309
§ 371 (c)(1),
(2), (4) Date: Dec. 31, 2012

(87) PCT Pub. No.: WO2012/003954
PCT Pub. Date: Jan. 12, 2012

(65) Prior Publication Data
US 2013/0095383 A1 Apr. 18, 2013

(30) Foreign Application Priority Data
Jul. 9, 2010 (DE) .................. 10 2010 026 613

(51) Int. Cl.
*H01M 4/58* (2010.01)
*H01G 11/24* (2013.01)
(Continued)

(52) U.S. Cl.
CPC .............. *H01M 4/485* (2013.01); *H01G 9/0425* (2013.01); *H01G 11/24* (2013.01);
(Continued)

(58) Field of Classification Search
None
See application file for complete search history.

(56) References Cited

U.S. PATENT DOCUMENTS 2,882,244 A 4/1959 Milton et al.
2,950,952 A 8/1960 Breck et al.
(Continued)

FOREIGN PATENT DOCUMENTS

CN 101777654 A 7/2010
EP 1418599 A1 5/2004
(Continued)

OTHER PUBLICATIONS

IPDL Machine Translation of the Detailed Description of JP 10-270018A (Oct. 1998).*
(Continued)

*Primary Examiner* — Gregg Cantelmo
(74) *Attorney, Agent, or Firm* — Caesar Rivise, PC

(57) ABSTRACT

The invention relates to the use of new crystalline phosphate- and silicate-based electrode materials, preferably having a hopeite or zeolite lattice structure, which are suitable more particularly for lithium ion batteries and lithium capacitors based on non-aqueous systems. The structure of the inventively used electrode material comprises at least a) 2 to 193 atom % of structure-forming ions M in the form of a lattice structure comprising $(MX_4)^{n-}$ coordination polyhedra, where M is selected from one or more elements from groups 2-15, b) 8 to 772 atom % of anions X in the form of a lattice structure comprising $(MX_4)^{n-}$ coordination polyhedra, where n=a number from 2-4, X is selected from one or more elements from groups 16 and 17, preferably oxygen, and a fraction of up to 25.01% of the anions X may be replaced by a halide ion such as $F^-$ or $Cl^-$ or by $OH^-$, c) 0 to 5 atom % of immobile, structure-forming cations of one or more elements from groups 3-13 of the Periodic Table, and d>0 to 46 atom % of mobile cations selected from elements from group 1 or group 11 of the Periodic Table, the structure having at least one channel which is free or is filled wholly or partly with one or more species of the mobile cations and which passes through the unit cell of the structure.

12 Claims, 33 Drawing Sheets

(51) Int. Cl.
*H01G 11/30* (2013.01)
*H01G 11/46* (2013.01)
*H01G 11/50* (2013.01)
*H01G 9/042* (2006.01)
*H01M 10/052* (2010.01)
*H01M 4/02* (2006.01)
*H01M 4/66* (2006.01)
*H01M 4/485* (2010.01)
*H01M 4/48* (2010.01)
*C23C 22/36* (2006.01)

(52) U.S. Cl.
CPC .............. *H01G 11/30* (2013.01); *H01G 11/46* (2013.01); *H01G 11/50* (2013.01); *H01M 4/483* (2013.01); *H01M 4/58* (2013.01); *H01M 4/5825* (2013.01); *H01M 4/661* (2013.01); *H01M 4/668* (2013.01); *H01M 10/052* (2013.01); *H01M 2004/028* (2013.01); *Y02E 60/122* (2013.01); *Y02E 60/13* (2013.01)

(56) References Cited

U.S. PATENT DOCUMENTS

| | | | |
|---|---|---|---|
| 3,130,007 | A | 4/1964 | Breck |
| 4,124,686 | A | 11/1978 | Grose et al. |
| 4,333,859 | A | 6/1982 | Vaughan et al. |
| 4,457,989 | A * | 7/1984 | Coetzer .................. 429/102 |
| 4,503,023 | A | 3/1985 | Breck et al. |
| 4,544,538 | A | 10/1985 | Zones |
| 4,546,055 | A * | 10/1985 | Coetzer et al. ............. 429/103 |
| 6,709,644 | B2 | 3/2004 | Zones et al. |
| 7,084,002 | B2 * | 8/2006 | Kim et al. .................. 438/104 |
| 2008/0099720 | A1 | 5/2008 | Huang et al. |
| 2010/0142123 | A1 * | 6/2010 | Smith et al. ................. 361/504 |
| 2010/0173197 | A1 | 7/2010 | Li et al. |

FOREIGN PATENT DOCUMENTS

| | | |
|---|---|---|
| EP | 2196434 A1 | 6/2010 |
| GB | 841812 | 7/1960 |
| GB | 2076793 A | 12/1981 |
| JP | 4130262 A | 5/1992 |
| JP | 10270018 A | 10/1998 |
| JP | 2001229976 A * | 8/2001 |
| WO | 2007035432 A2 | 3/2007 |
| WO | WO 2010054383 A2 * | 5/2010 |

OTHER PUBLICATIONS

Dalas et al., "Polyaniline/zeolite as the cathode in a novel gel electrolyte primary dry cell", Abstract No. 05/02097 in Fuel and Energy Abstracts, Elsevier, vol. 46, No. 5, Sep. 1, 2005, pp. 309-310.
Dalas et al., Polyaniline/zeolite as the cathode in a novel gel electrolyte primary dry cell, Journal of Power Sources, Elsevier SA, CH, vol. 128, No. 2, Apr. 5, 2004, pp. 319-325.
Walcarius, "Electroanalytical Applications of Mi-croporous Zeolites and Mesoporous (Organo) Silicas: Recent Trends", Electroanalyses, vol. 20, No. 7, Apr. 1, 2008, pp. 711-738.
Ravel et al., Journal of Power Sources, 2001, 97-98, pp. 503-507.
Harrison et al., "NaZnPO4H20, an Open-Framework Sodium Zincophosphate with a New Chiral Tetrahedral Framework Topology," Chem. Mater., 1996, 8, pp. 145-151.
Chung et al., "Electronically conductive phospho-olivines as lithium storage electrodes," Nature Mat. 2002, 1, 123-128.
Calvo, "The Crystal Structure of A—Zn3(PO4)2," Canadian Journal of Chemistry, vol. 43, Jul. 1964, 436-445.
Herschke et al., "The Role of Hydrogen Bonding in the Crystal Structures of Zinc Phosphate Hydrates," Chem. Eur. J. 2004, 10, 2795-2803.
Type Material: Sodalite SOD, Zeolite Atlas, p. 5.
Nikonenko et al., "The Thermal Dehydration of Hopeite," Russian Journal of Inorganic Chemistry 30, Part 1, 1985, pp. 13-16.
Kallfass et al., "The Transition Metal-rich Orthophosphate Arrojadite with Special Structural Features," Naturforschung, 2010, 65b, 1427-1433.
Barrer et al., "The Hydrothermal Chemistry of Silicates. Part I. Synthetic Lithium Aluminosilicates," E.A.D. in J. Chem. Soc., 1951, pp. 1267-1278.
International Search Report of PCT/EP2011/003309 dated Aug. 13, 2012.

* cited by examiner

PHOSPHATE- AND SILICATE-BASED ELECTRODE MATERIALS, MORE PARTICULARLY FOR LITHIUM ION BATTERIES AND LITHIUM CAPACITORS

BACKGROUND OF THE INVENTION

The present invention relates to new phosphate- and silicate-based electrode materials, which can be used advantageously, in particular, for lithium ion secondary batteries and electric double layer capacitors (ELDC), in particular lithium capacitors, as well as for other electric and electrochemical storage devices on the basis of non-aqueous systems.

In the last decade based on various economic and ecological grounds, not least for preventing a climatic catastrophe, the development of more efficient, but at the same time more cost-effective electric storage systems such as batteries and capacitors with as much as possible advantageous chemical, electric and mechanical properties and good environmental compatibility, received a high priority worldwide.

For energy storage, on the one hand, battery systems are used when it is necessary to store high amounts of energy for a long time; on the other hand, double layer capacitors are used when a given application requires high power density and cycle stability.

In the double layer capacitors, by applying electric potential, a Helmholz double layer is built on both electrodes, the energy is stored in a purely electrostatic manner (without participation of redox processes). This process is very fast, so that the EDLCs are suitable for recuperation techniques (energy recuperation from braking energy). However, the charge can not be stored for a long time because the leaking currents are very high. By the use of highly porous electrode materials (porous graphite), the effective usable electrode surface in the EDLCs increases by a factor of 1000 and more compared to the simple plate capacitors.

The use of graphite electrodes in the EDLCs limits the maximum voltage to 2.5 V. This limit is valid also for the known lithium capacitors, which, the same as the EDLCs, are based on the use of porous carbon (graphite) as electrodes material, which limits the usable voltage to 2.5 V.

In the batteries, the energy is stored electrochemically in oxidations or reduction processes. In this way, today the maximum energy density in the lithium ion batteries is about 190 mAh/g. The self-discharge can thereby be limited to up to 10% per year. Especially in lithium ion batteries, the entire stored energy can never be given back because when the final discharge voltage falls below 2.5 V the structure of the cathode material is destroyed.

In the technology, the advantages of both storage systems are increasingly combined; capacitors are used for starting of large internal combustion engines, e.g. of boats or trains, because the batteries alone can never provide the high currents needed for the starting. In the case of energy recuperation from braking energy, also very high energy amounts must be stored in a short time, which overstrains today's battery technology and that is why capacitor banks are used to this purpose.

In view of the different principles of storage and operation of batteries and capacitors and the special material requirements connected to them, traditionally different materials are used for both types of storage systems.

For the development of more efficient storage systems, among other things, various new electrode materials with improved properties were developed and used. One such material was synthetically produced $LiFePO_4$, an orthophosphate, whose electric properties were described for a first time in 1997, and which has established itself in the meantime as a preferred cathode material for lithium ion batteries. Also the naturally occurring mineral triphylite with a (simplified) chemical formula $LiFe-PO_4$ has proven itself as useful cathode material (Ravet et al. in Journal of Power Sources, 2001, 97-98, 503-507). These $LiFePO_4$ materials have an olivine structure, and the commercially used variants possess, despite their general suitability as cathode materials, still certain drawbacks and partially have very different properties. A basic drawback is, for example, that in the course of the charging and discharging cycles these materials are subject to chemical and structural changes which lead with the time to a significant and progressing reduction of the storage capacity.

In the European patent application 08021669.0, another electrode material on phosphate base was described, which has the structure of the mineral arrojadite and can be obtained from it by, e.g., means of ion-exchange treatment for introduction of lithium ions or other desired ions. This material is superior to the $LiFePO_4$-based materials with respect to its physical and electrochemical properties in the use in batteries and can also be obtained easily, in a cost-effective and environment-friendly manner.

Notwithstanding, there is a continuing need for other electrode materials with also good or even better properties, which can be used in a cost-effective manner above all for various electric and electrochemical storage devices on the basis of non-aqueous systems, in particular for both batteries and capacitors.

Extensive research by the inventors has led to the surprising finding that a wide range of crystal phosphate- and silicate-based materials with interrelated structures show excellent properties as electrode materials in non-aqueous systems and are very suitable, in particular, for lithium ion secondary batteries and lithium ion capacitors. These structures are, preferably, hopeite and zeolite structures.

Both structure types have, independently of their respective chemical composition, structural similarities. In both the hopeite and zeolite structures, coordination polyhedrons appear in the form of tetrahedrons as central structural motif. The tetrahedrons are the exclusive structural motif of the zeolite structures. By the corresponding combination of the tetrahedrons, many different zeolite structures with different kinds of channels or hollow spaces can be obtained (e.g. the fibre zeolite mordenite with one-dimensional channels or the cube zeolite chabasite with a three-dimensional channel system).

In contrast to the zeolite structures, the hopeite structure contains, along the tetrahedrons, also octahedrons as another type of coordination polyhedrons. In the hopeite structure, rings from several interlinked tetrahedrons are built, which are arranged in a periodical layered structure. These layers from tetrahedrons arranged in the form of rings are interlinked with each other by octahedrons or quadratic pyramids.

The mineral hopeite is a zinc phosphate with the ideal chemical molecular formula $Zn_3(PO_4)_2 \times 4H_2O$. Zinc phosphates are used for phosphatization of metals and as sensor materials. As electrode material, namely as a lamellar layer conducting zinc ions on a Zn anode in an aqueous system, they were until now mentioned only in a single publication in relation to an implantable electrode for a pacemaker (WO 2007/035432 A2).

Zeolites are used in the technology, among other things, as reversible ion exchangers in aqueous systems, in which the known mobility of the guest ions in the host lattice is used. However, until now no electric properties have been found in the zeolites, which could permit their use as material for electrodes, e.g. as cathode material in a lithium ion battery or as material for electrodes in an ELDC or another capacitor, for example a lithium capacitor, in particular in a non-aqueous system.

The above-discussed object of the invention, namely the provision of new electrode materials with excellent physical and electrochemical properties, in particular in non-aqueous battery and capacitor systems, could thus be achieved by the use of phosphate- and silicate-based materials of the invention, as well as by the electrochemical storage device and the capacitor according to the invention. According to one embodiment of the invention, the electrode material used is a crystalline material with a structure which comprises at least a) 2 to 193 atom % structure-building ions M in the form of a lattice structure comprising $(MX_4)^{n-}$-coordination polyhedrons, wherein M is selected from one or more elements of groups 2-15,
b) 8 to 772 atom % anions X in the form of a lattice structure comprising $(MX_4)^{n-}$-coordination polyhedrons, wherein n=a number from 2-4, X is selected from one or more elements from the groups 16 and 17, preferably oxygen, and a portion of up to 25.01% of the anions X may be replaced by a halogenide ion such as $F^-$ or $Cl^-$ or by $OH^-$,
c) 0 to 5 atom % non-mobile structure-building cations of one or more of the elements of the groups 3-13 of the periodic table of elements, and
d) >0 to 46 atom % mobile cations, selected from elements of group 1 or group 11 of the periodic table of elements, which structure has at least one free channel or a channel filled fully or partially with one or more species of the mobile cations, which extends through the unit cell of the structure, provided that at least in the case when more than 50% of the M atoms are P, the structure represents a hopeite or zeolite lattice structure.

According to the invention, it is preferred that the structure of the crystalline material comprises or represents a hopeite or zeolite lattice structure.

In all these structures, which are adequate according to the invention, the $MO_4$-coordination polyhedrons, together with the coordination polyhedrons of the non-exchangeable structure-building cations on fixed lattice locations, build a rigid host lattice, in which, in addition, there are open channels, where mobile cations and water can be deposited. Since the coordination spheres in the channels are incomplete, these cations can be exchanged in an electric or chemical manner. The mobility of these cations in an electric field opens the way for using these materials as materials for electrodes.

These mobile cations are, preferably, selected from the group comprising $Li^+$, $Na^+$, $K^+$ and $Ag^+$ and particularly preferred is $Li^+$.

An advantage of the materials used according to the invention is that a relatively large amount of the desired mobile cations can be stored in these channels and moved therein, which leads to a usable high electric capacitance. Typically, the used electrode material can contain up to 46 atom %, especially up to 26 atom %, preferably 6 to 15 atom % of the material in mobile cations.

A further advantage is that the used material, unlike the commercially used materials, such as $LiFePO_4$, remains both chemically stable and dimensionally stable also after repeated charging and discharging cycles. In this way, the storage and transport of the respective mobile ions is not affected, and the electric storage capacity or the usable discharge capacity is maintained even after a large number of charging/discharging cycles. For example, the charging capacity of a hopeite charged with Li ions was practically unchanged after several hundred cycles and also the discharging capacity of a mordenite charged with Li ions.

In the present application, a new class of electrode materials is described, which can be used in a very advantageous way both as electrode materials of double layer capacitors, for example the so-called "lithium ion capacitors" (LIC) with usable operating voltages above 2.5 V and high charging and discharging currents, and for lithium ion batteries.

By demonstrating the suitability of zeolites as electrode material, a completely new class of substances is revealed, in which the relevant chemical and physical properties, such as composition, channel diameter, etc., can be adjusted in a custom-made manner within wide ranges and make possible the systematic optimization of the respective systems.

With the notions "phosphate-based materials" and "silicate-based materials", materials with the composition defined in certain embodiments of the invention, in which more than 50% of the M atoms are P or Si, are designated here.

Elements from groups 13-15 of the periodic table of elements can substitute each other in the structures adequate according to the invention, in particular the hopeite or zeolite structures, and in principle continuous transitions of 0-100% are possible. The substitution of Al for Si leads to the known aluminosilicates, while the analogue substitution of Al for P gives aluminophosphates. Also the oxygen atoms of the $MO_4$-coordination polyhedrons can be partially replaced, in particular up to about 25.01%, by other anions such as halogenide ions, preferably F and $Cl^-$ or by $OH^-$ without loss of the initial structure.

The non-mobile structure-building cations of one or more elements from the groups 3-13 of the periodic table of elements in the materials used according to the invention, in particular those with hopeite or zeolite structure, are selected preferably from the group consisting of Zn, Mn, Fe, Co, Ni, Cr, V, Sc, Ti and Cu and combinations of them. Particularly preferred is Zn or a combination of Zn with other transition metal cations. Also a partial replacement of the structure-building transition metal cations by metal ions from groups 13 and 14 of the periodic table of elements such as, for example Al, Ga, Si and Ge, is possible. In the zeolite channels there are many positions which can theoretically be occupied. So, for example, in the zeolite chabasite 46 of these positions were actually occupied (in the case of calcium- and water-containing chabasite with six $Ca^{2+}$ ions and 40 water molecules or in the case of dehydrated calcium-containing chabasite only with six $Ca^{2+}$ ions). The water can be replaced at least partially by mobile cations as defined above, in particular Li.

The hopeite structure is derived from the known mineral hopeite, a zinc phosphate, with this crystallographic structure and was initially observed only for phosphate-based materials. In the meantime, also silicate analogues with this structure, e.g. hodgkinsonite $Zn_2Mn(SiO_4) \times OH_2$ and arsenate analogues with this structure, e.g. rollandite $Cu_3(AsO_4) \times 4H_2O$ are known.

Surprisingly, the inventors were able to demonstrate that a phosphate-based material with a hopeite structure can be transformed also into a mordenite structure (i.e. into a zeolite structure).

The zeolite structures are known structures for mostly silicate-based materials, in particular, including the aluminosilicates. Specific representatives of this general structure type, which according to the invention can be used as electrode material, are selected from one of the following structures according to the nomenclature of the International Zeolite Association (ZA) (http://www.iza-structure.org/): ABW (BW)A-Li, ANA (analcime), CAN (cancrinite), CHA (chabasite), ERI (erionite), FAU (faujasite), GIS (gismondite), GME (gmelinite), HEU (heulandite), MOR (mordenite), NAT (natrolite), PHI (phillipsite) or SOD (sodalite). The designations given in parenthesis are those of known minerals, in which the corresponding structure type was observed. As evident from the above remarks, however, various replacements of the different components under preservation of the basic structure are possible and thus the structure types, which are adequate according to the invention, are largely independent, within the framework of the above provided limits, of the specific chemical composition.

The chemical composition of the respective framework structures (without cations or water molecules in the hollow spaces) of the different structure types, which can be used according to the invention, is described here below in more details.

Zeolite Type ABW (material type: Li-A (Barrer and White) described in Barrer, R. M. & White, E. A. D. in J. Chem. Soc. 1951, 1267-1278))
General formula of the framework (without cations or water molecules in the hollow spaces): $[X_4Y_4O_{16}]$
X=one or more elements from the groups 3-12 (e.g. Co, Zn), group 2 (e.g. Be, Mg) or the group 13 (e.g. Al, Ga) of the periodic table of elements
Y=one or more elements from the group 14 (e.g. Si, Ge) or the group 15 (e.g. P, As) of the periodic table of elements.
Further materials with the same structural setup: UCSB-3

Zeolite Type ANA (material type: Analcime)
General formula of the framework (without cations or water molecules in the hollow spaces): $[X_{16}Y_{32}O_{96}]$
X=one or more elements from the groups 3-12 (e.g. Co, Zn), group 2 (e.g. Be, Mg) or the group 13 (e.g. Al, Ga) of the periodic table of elements
Y=one or more elements from the group 14 (e.g. Si, Ge) or the group 15 (e.g. P, As) of the periodic table of elements
Other materials and minerals (the latter being designated by underlining) with the same structural setup: Al—PO-24 (aluminophosphate-twenty four), AlPO$_4$-pollucite, amminoleucite, Ca-D, leucite, hsianghualite, Na—B, pollucite, wairakite Zeolite Type CAN (material type: cancrinite)
General formula of the framework (without cations or water molecules in the hollow spaces): $[X_6Y_6O_{24}]$
X=one or more elements from the groups 3-12 (e.g. Co, Zn), group 2 (e.g. Be), or group 13 (e.g. Al, Ga) of the periodic table of elements
Y=one or more elements from the group 14 (e.g. Si, Ge) or group 15 (e.g. P) of the periodic table of elements
Patented materials: ECR-5 (E. Patent A-190,90, (1986))
Other materials and minerals (the latter being designated by underlining) with the same structural setup: Davyne, microsommite, tiptopite, vishnevite Zeolite Type CHA (material type: chabasite)
General formula of the framework (without cations or water molecules in the hollow spaces): $[X_{12}Y_{24}O_{72}]$
X=one or more elements from the groups 3-12 (e.g. Co, Zn), group 2 (e.g. Mg) or group 13 (e.g. Al) of the periodic table of elements
Y=one or more elements from the group 14 (e.g. Si, Ge) or the group 15 (e.g. P) of the periodic table of elements
Patented materials: Linde D (U.S. Pat. No. 2,950,952, (1960)), Linde R (Brit. Patent 841,812, (1960)), LZ-218 (U.S. Pat. No. 4,333,859, (1982)), Phi (U.S. Pat. No. 4,124,686, (1978)), SSZ-13 (Standard Oil Synthetic Zeolite—thirteen; U.S. Pat. No. 4,544,538, (1985)), SSZ-62 (Standard Oil Synthetic Zeolite—sixty-two; U.S. Pat. No. 6,709,644 B2, (2004)) Further materials and minerals (the latter being designated by underlining) with the same structural setup: Al—PO-34 (Aluminophosphate-thirty four), DAF-5 (Davy Faraday Research Laboratory—five), MeAPO-47, MeAPSO-47, SAPO-47 (Silico-Alumino phosphate-forty seven), UiO-21 (University of Oslo-twenty-one), ZK-14 (Zeolite Kerr—fourteen), ZYT-6, Willhendersonit Zeolite Type ERI (material type: erionite)
General formula of the framework (without cations or water molecules in the hollow spaces): $[X_9Y_{27}O_{72}]$
X=one or more elements from the groups 3-12 (e.g. Co, Zn), group 2 (e.g. Mg) or group 13 (e.g. Al) of the periodic table of elements
Y=one or more elements from the group 14 (e.g. Si, Ge) or the group 15 (e.g. P) of the periodic table of elements
Patented materials: LZ-220 (U.S. Pat. No. 4,503,023, (1985))
Other materials with the same structural setup: ALPO-17, Linde T Zeolite Type FAU (material type: faujasite)
General formula of the framework (without cations or water molecules in the hollow spaces): $[X_{58}Y_{134}O_{384}]$
X=one or more elements from the groups 3-12 (e.g. Co, Zn), group 2 (e.g. Be) or group 13 (e.g. Al) of the periodic table of elements
Y=one or more elements from the group 14 (e.g. Si, Ge) or group 15 (e.g. P) of the periodic table of elements
Patented materials: CSZ-1 (UK Patent GB 2,076,793, (1981)), ECR-30 (E. Patent 0,351,461, (1989)), LZ-210 (U.S. Pat. No. 4,503,023, (1985)), Zeolite X (Linde X; U.S. Pat. No. 2,882,244, (1959)), Zeolite Y (Linde Y; U.S. Pat. No. 3,130, 007, (1964))
Other materials with the same structural setup: Li-LSX, SAPO-37 (Silico-Aluminophosphate—thirty-seven), ZSM-20 (Zeolite Socony Mobil—twenty), ZSM-3 (Zeolite Socony Mobil—three), zinc phosphate X, beryl phosphate X Zeolite Type GIS (Material Type: Gismondite)
General formula of the framework (without cations or water molecules in the hollow spaces): $[X_8Y_8O_{32}]$
X=one or more elements from the groups 3-12 (e.g. Co, Zn), group 2 (e.g. Be) or group 13 (e.g. B, Al) of the periodic table of elements
Y=one or more elements from the group 14 (e.g. Si, Ge) or group 15 (e.g. P) of the periodic table of elements
Other materials and minerals (the latter being designated by underlining) with the same structural setup: Amicite, garronite, gobbinsite, MAPO-43, MAPSO-43 (MgAl(P,Si)O$_4$-43), Na—P1, Na—P2, low-silica Na—P, high-silica Na—P Zeolite Type GME (Material Type: Gmelinite)
General formula of the framework (without cations or water molecules in the hollow spaces): $[X_8Y_{16}O_{48}]$
X=one or more elements from the groups 3-12 (e.g. Co, Zn), group 2 (e.g. Be) or group 13 (e.g. Al) of the periodic table of elements
Y=one or more elements from the group 14 (e.g. Si, Ge) or group 15 (e.g. P) of the periodic table of elements Zeolite Type HEU (material type: heulandite)
General formula of the framework (without cations or water molecules in the hollow spaces): $[X_8Y_{28}O_{72}]$
X=one or more elements from the groups 3-12 (e.g. Co, Zn), group 2 (e.g. Be) or group 13 (e.g. Al) of the periodic table of elements
Y=one or more elements from the group 14 (e.g. Si, Ge) or group 15 (e.g. P) of the periodic table of elements
Patented materials: LZ-219 (U.S. Pat. No. 4,503,023 (1986)) Other materials and minerals (the latter being designated by underlining) with the same structural setup: Clinoptilolite Zeolite Type MOR (Material Type: Mordenite)
General formula of the framework (without cations or water molecules in the hollow spaces): $[X_8Y_{40}O_{96}]$
X=one or more elements from the groups 3-12 (e.g. Co, Zn), group 2 (e.g. Be) or group 13 (e.g. Al) of the periodic table of elements Y=one or more elements from the group 14 (e.g. Si, Ge), elements of group 15 (e.g. P) of the periodic table of elements Patented materials: LZ-211 (U.S. Pat. No. 4,503,023, (1985))

Other materials and minerals (the latter being designated by underlining) with the same structural setup: Na-D, RMA-1, maricopaite Zeolite Type NAT (material type: natrolite)

General formula of the framework (without cations or water molecules in the hollow spaces): $[X_{16}Y_{24}O_{80}]$ X=one or more elements from the groups 3-12 (e.g. Co, Zn), group 2 (e.g. Be) or group 13 (e.g. Al) of the periodic table of elements Y=one or more elements from the group 14 (e.g. Si, Ge) or group 15 (e.g. P) of the periodic table of elements Other materials and minerals (the latter being designated by underlining) with the same structural setup: Gonnardite, mesolite, metanatrolite, paranatrolite, scolezite, tetranatrolite Zeolite Type PHI (material type: phillipsite)

General formula of the framework (without cations or water molecules in the hollow spaces): $[X_6Y_{10}O_{32}]$ X=one or more elements from the groups 3-12 (e.g. Co, Zn) group 2 (e.g. Be) or group 13 (e.g. Al) of the periodic table of elements Y=one or more elements from the group 14 (e.g. Si), or group 15 (e.g. P) of the periodic table of elements Other materials and minerals (the latter being designated by underlining) with the same structural setup: Harmotome, DAF-8 (Davy Faraday Research Laboratory—eight), ZK-19 (Zeolite Kerr—nineteen)

Zeolite Type SOD (material type: sodalite)

General formula of the framework (without cations or water molecules in the hollow spaces): $[X_6Y_6O_{24}]$ X=one or more elements from the groups 3-12 (e.g. Co, Zn) group 2 (e.g. Be) or group 13 (e.g. Al) of the periodic table of elements Y=one or more elements from the group 14 (e.g. Si, Ge), or group 15 (e.g. P, As) of the periodic table of elements Other materials and minerals (the latter being designated by underlining) with the same structural setup: Bicchulite, helvine, G, genthelvite, noseane, tugtupite, ALPO-20 (aluminophosphate—twenty), SIZ-9

For a material with hopeite structure (ideal chemical composition of the hopeite: $Zn_3(PO_4)_2 \times n\, H_2O$) in particular, the following substitutions are preferred:

a) Zn is fully or partially (0-100%) replaced by a transition metal (Tm) of the groups 3-12 of the periodic table of elements, preferably selected from the group consisting of Zn, Mn, Fe, Co, Ni, Cr, V, Sc, Ti, Cu up to the formula $Tm_3(PO_4)_2 \times n\, H_2O$;

b) Zn is fully or partially (0-100%) replaced by a combination of two transition metals from the groups 3-12 of the periodic table of elements, preferably selected from the group consisting of Zn, Mn, Fe, Co, Ni, Cr, V, Sc, Ti, Cu (Tma+Tmb) or a combination of a transition metal from the groups 3-12 of the periodic table of elements, preferably selected from the group consisting of Zn, Mn, Fe, Co, Ni, Cr, V, Sc, Ti, Cu (Tma)+(Tmb), an element from group 13, up to the formula $(Tm_a)_x(Tm_b)_{1-x})_3(PO_4)_2 \times n\, H_2O$;

c) Zn is fully or partially (0-100%) replaced by a combination of 3 transition metals from the groups 3-12 of the periodic table of elements, preferably selected from the group consisting of Zn, Mn, Fe, Co, Ni, Cr, V, Sc, Ti, Cu (Tma+Tmb+Tmc) or 2 transition metals from the groups 3-12 of the periodic table of elements, preferably selected from the group consisting of Zn, Mn, Fe, Co, Ni, Cr, V, Sc, Ti, Cu (Tma+Tmb)+(Tmc), an element from group 13, up to the formula $$((Tm_a)_x(Tm_b)_y(Tm_c)_z)(PO_4)_2 \times n H_2O \text{ with } x+y+z=3;$$

d) Zn is fully or partially (0-100%) replaced by a combination of one element from group 2 (Be—Ba), (MG-II), and one element from the group, which comprises transition metals from the groups 3-12 of the periodic table of elements, preferably selected from the group consisting of Zn, Mn, Fe, Co, Ni, Cr, V, Sc, Ti, Cu, and an element from group 13, (Tm) up to the formula $((MG\text{-}II)_x(Tm)_{1-x})_3(PO_4)_2 \times n\, H_2O$;

e) Zn is fully or partially (0-100%) replaced by a combination of one element from group 2 (Be—Ba), (MG-II) and two elements from the groups 3-12 of the periodic table of elements, preferably selected from the group which comprises Zn, Mn, Fe, Co, Ni, Cr, V, Sc, Ti, Cu, and an element from group 13, up to the formula $((MG\text{-}II)_x\,(Tm_a)_y\,(Tm_b)_z)(PO_4)_2 \times n\, H_2O$ with $x+y+z=3$.

In addition, in each of the above cases, P from the $PO_4$ entity can be fully or partially replaced by one or more elements from group 13, preferably Ga, from group 14, preferably Si, Ge, and group 15, preferably As and Sb.

In addition, in each of the above cases, the water content n can be between n=0-4, independently of the remaining chemical composition.

The crystalline materials usable according to the invention, can be obtained, for example, by using a method comprising the following steps: i) providing a natural or synthetic mineral with the structure and composition of structure-building anions and cations as specified herein, ii) complete or partial removal of the exchangeable cations present, and eventually of other components such as water and impurities, iii) charging the channels with one or more desired mobile cation(s), in particular $Li^+$, $Na^+$, $K^+$ and/or $Ag^+$.

The removal of the exchangeable cations can, for example, be achieved by chemical treatment with known complexing agents and chelators such as EDTA (ethylendiamine tetraacetic acid), acetylacetone, 1,5-diphenylthiocarbazone, crown ethers, etc.

The charging of the channels with one or more desired mobile cation(s), e.g. Li, Na, K and/or Ag, can take place, for example, by immersion in a molten salt, e.g. for Li-enrichment with $LiClO_4$, suspension in a salt solution or electrochemically.

Alternatively, the materials used according to the invention can be obtained also by direct chemical synthesis. To this purpose, for example, a hydrothermal synthesis method can be used that is analogous to the method described in Harrison, W. T. A. et al. in *Chem. Mater.* 1996, 8, 145-151. Typically, a) exchangeable cations as a solvable salt, e.g. $Li^+$, $Na^+$, $K^+$ and/or $Ag^+$, b) non-exchangeable transition metal cations, e.g. in the form of an oxide, c) $MO_4$ anions, e.g. in the form a solvable phosphate such as $(NH_4)_2HPO_4$ or $(Na,K)_2HPO_4$ or silicate such as silicic acid $[SiO_x(OH)_{4-2x}]_n$, can be reacted in the desired ratios in a pressure receptacle in the presence of water in a temperature range of 20-600° C.

After the synthesis has been completed, the desired product is in aqueous solution and can be obtained, by removing the aqueous phase, as a crystalline product, which contains in channels the desired amounts of the respective mobile cations, $Li^+$, $Na^+$, $K^+$ and/or $Ag^+$.

The crystalline material used according to the invention can be obtained as a single crystal, in which the channels run through the entire single crystal, or as anisotropic microcrystalline (500 μm-1 μm) or nanocrystalline (0.999 μm-0.001 μm) material, in which the channels are preferably oriented in one direction in space. The orientation of the crystallites, which can, for example, take place under pressure, increases considerably the electric conductivity of the material by up to several powers of ten (texture effect).

In one embodiment, the crystalline material is ground to powder and then can, eventually in the presence of a suitable binder such as polyinylfluoride (PVD), be pressed into a tablet or a foil. In this pressurizing process, the above-mentioned orientation of the channels takes place.

The electrode material, which comprises a crystalline material as described or consists of it, is typically, eventually by adding electronically conducting auxiliary material, preferably graphite, deposited on electronically conducting substrate material, which is selected from the group of metals (e.g. aluminium, copper, titanium), alloys (e.g. steel, bronze) or electronically conducting plastics (e.g. poly(p-phenylene-vinylene) (PPV), polyaniline (PANT), polypyrrole (PPy), polythiophene), and constitutes an electrode with the same. Alternatively, the electrode may also consist only of this electrode material. This electrode may be an anode or a cathode, preferably it is a cathode.

The electrode material can be deposited on the substrate material in the traditional way as powder or foil with a binding agent. However, it is particularly preferred that the deposition on the substrate material takes place by direct coating using principally known methods (Chung, S.-Y. et al. in *Nature Mat.* 2002, 1, 123-128). For example, hopeite has been used for a long time on industrial scale as a phosphate corrosion protection layer for steels and other iron materials. To this purpose, as a rule, a layer thickness of about 20 μm is used; however, in the patent literature there are also processes described, with which layers of several millimetres can be obtained (DE 2030105 A1). For the use as electrode material, a layer thickness of about 0.02 to 0.1 mm is preferred.

The very good adhesion of the hopeite phosphate layers permits an extremely small bending radius of the coated sheets and enables the design of prismatic batteries, which was not possible with the traditional phosphate-based electrode materials due to the worse adhesive properties.

The direct coating has the advantage of a very simple and extremely cost-effective production and offers, in addition, an additional advantage in that—due to the absence of binding and filling agents—a corresponding capacity loss of electrode material is prevented.

In another aspect, the present invention relates to an electrochemical storage device, which comprises the above-described crystalline material or the above-described electrode, in particular the cathode.

This electrochemical storage device is typically a battery, in case that the electrode material has oxidable or reducible centres (metal cations such as Zn, Mn, Fe, Cr, Ti), in particular a rechargeable secondary battery. In a preferred embodiment, this is a prismatic battery.

Preferably, the battery is a Li, Na, K, or Ag ion battery, particularly preferably a lithium ion battery, and the crystalline material used as electrode material according to the invention then contains exclusively or predominantly the corresponding type of cations as mobile and conducting cations.

Basically, all types and arrangements which are known in the state of the art for such batteries, in particular secondary batteries, with aqueous and non-aqueous electrolytes and, depending on the type, with or without separator, may be used. Particularly preferably, however, the materials, according to the invention are used in non-aqueous systems (with aprotic electrolytes). With these non-aqueous battery systems according to the invention, voltages of more than 1.6 V and up to 3.5 V and more can be achieved. A specific, non limiting embodiment is described in the following example 2.

A particular advantage of the batteries manufactured with the materials used according to the invention, in particular the lithium ion batteries, is that they are capable of a deep discharge of up to at least 0.05 V, preferably 0.02 V, and up to short-circuit strength. Such a deep discharge, which is based on the special structural properties, above all the rigid framework of the host structure, of the materials used according to the invention, could not be achieved with the traditional electrode materials.

A related aspect of the invention refers to the use of a crystalline material as defined herein, in which more than 50% of the M atoms are P, in particular with a hopeite structure, as a general electro-active material, especially as an electro-active separator material (e.g. for batteries) or a semipermeable membrane.

A further aspect of the invention is a capacitor, in particular a double-layer capacitor, which stores the electric energy through polarization of the electrodes.

This electric storage cell is built analogous to the lithium ion battery, wherein in this case the anode and the cathode are replaced with two identical electrodes. The structure of the cell thus comprises the components electrode—separator—electrode as well as an aprotic electrolyte.

This double-layer capacitor with electrodes, which consist of materials with a hopeite or zeolite structure, can, in contrast to the commercially available double-layer capacitors with electrodes from porous graphite, be charged with voltages of above 5 V. The discharge curve of this capacitor then typically falls quickly until a material-specific voltage is reached, from where the discharge takes place very slowly as in a battery. A capacitor structure, according to the invention, with a sodalite electrode was tested in Example 10 and the results are shown in FIG. 26.

For the implementation of this aspect of the invention, an electrode material according to the invention is preferred, which, under the operating requirements of the capacitor, has none or only a limited number of oxidable or reducible centres.

The desirable number of redox centres can be predetermined to a large extent by the selection or the modification of a given electrode material or structure type. A purely silicatic zeolite, i.e. all structure-building ions M=Si, has practically no redox centres and is thus quite suitable for use as electrode material in capacitors, but hardly for batteries. By the successive replacement of the Si with other ions, such as, for example, Al or P (or replacement by other ions, as discussed herein at another place in more detail with respect to the definition of the electrode material used according to the invention), redox centres are generated, which guarantee or increase the suitability for batteries and reduce the suitability for capacitors. Many of the electrode materials according to the invention are suitable both for batteries and also, in particular at high electric currents (for example, the maximum charging current amounts to 10 times or more the nominal capacity of the capacitor), for use in capacitors. In the light of the above disclosure, the suitability of the respective electrode material, according to the invention, for batteries and/or capacitors, in particular for lithium batteries and/or lithium capacitors, can be determined easily by routine experiments.

BRIEF DESCRIPTION OF THE FIGURES

FIG. 23 FIG. 22 shows the discharging and charging curve of two cycles, following one after the other (consisting of discharging and charging of the battery), of a lithium ion battery, according to the invention, with a hopeite cathode on copper foil at deep discharge to U=−0.5 V in the first cycle.

For the purpose of comparison, a commercially available electrolyte capacitor (Elko) of the company Rubycon, 1000 μF, 6.3 V, was also cycled for four cycles (consisting of discharging and charging of the capacitor), in the voltage range between 0.05-4.05 V and at an amperage of 1 mA. After the fourth charging, the measuring of the voltage drop started. The voltage measured 5092 s after the charging amounts to U=1.14 V in the Elko of the company Rubycon, and in the electric storage unit according to the invention with an electrode of sodalite to U=1.41 V.

The following, non-limiting examples are given to illustrate the present invention in more details.

EXAMPLE 1

A microcrystalline material with a hopeite structure and lithium ions as mobile cations was obtained according to the hydrothermal synthesis method described by Harrison, W. T. A. et al. in *Chem. Mater.* 1996, 8, 145-151, and had the following composition $Zn_3(PO_4)_2 \times 4\, H_2O$.

EXAMPLE 2

Figure 19:
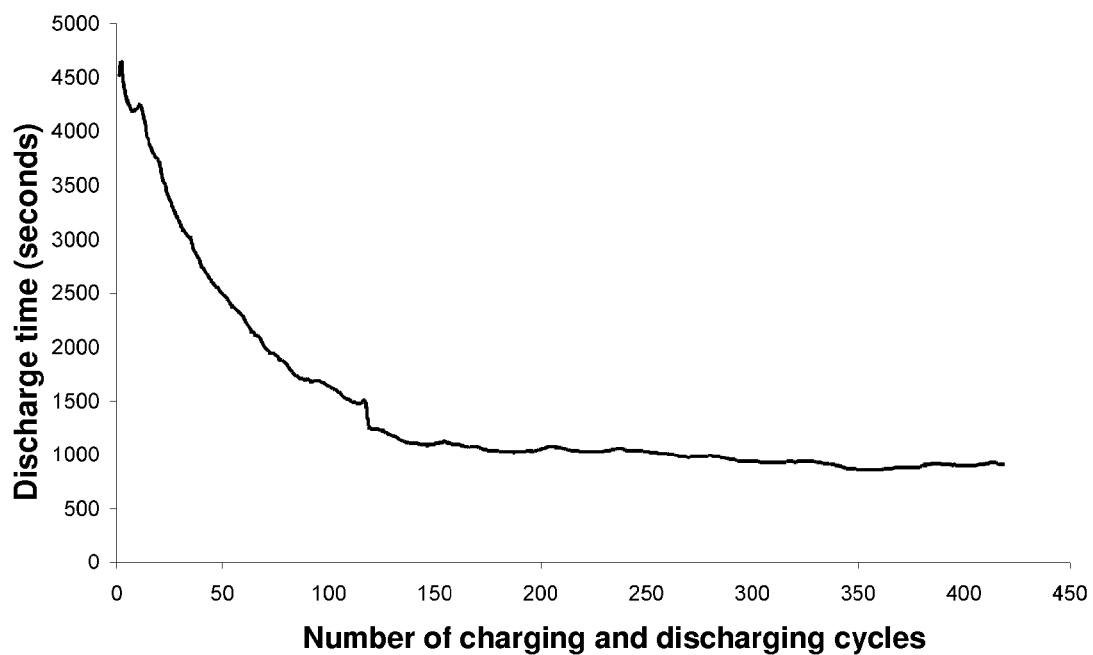
FIG. 19 shows the evolution of the discharge time, which is plotted as a function of the number of the discharging and charging cycles, of a lithium ion battery with hopeite cathode on copper foil according to the invention.

A synthetic hopeite, $Zn_3(PO_4)_2 \times 4\, H_2O$, was electrochemically charged with Li ions and used as a cathode in a lithium ion secondary battery (Chung, S.-Y. et al. in *Nature Mat.* 2002, 1, 123-128). A voltage of 3.61 V was generated with respect to a Li plate anode. FIG. 19 shows the stable evolution of the discharge time, which is plotted as a function of the number of the discharging and charging cycles, of this battery through several hundred cycles and demonstrates that a deep discharge in the range of 0.05 V-3.61 V has been achieved.

EXAMPLE 3

Figure 16:
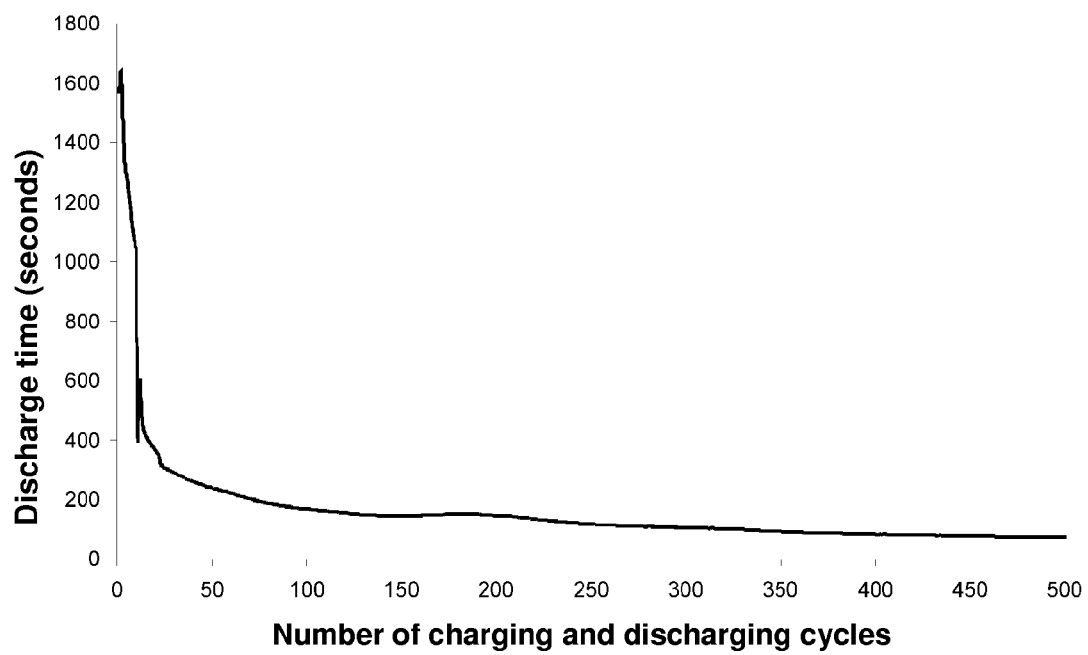
FIG. 16 shows the evolution of the discharge time, which is plotted as a function of the number of the discharging and charging cycles, of a lithium ion battery with mordenite cathode according to the invention.

A classical Si zeolite (commercial mordenite HS690, Wako Chemicals GmbH, Neuss) with the following chemical composition $[(Al,Si)_{48}O_{96}]$ (without considering the cations or the water molecules in the hollow spaces) was charged as in Example 2 with Li and was used as a cathode with the same setup as in Example 2. A voltage of 1.61 V was generated with respect to a Li plate anode. FIG. 16 shows the stable evolution of the discharging time, which is plotted as a function of the number of the discharging and charging cycles, of this battery in the course of several hundred cycles and demonstrates that a deep discharge in the range of 0.05 V-1.61 V has been achieved.

EXAMPLE 4

Figure 1A:
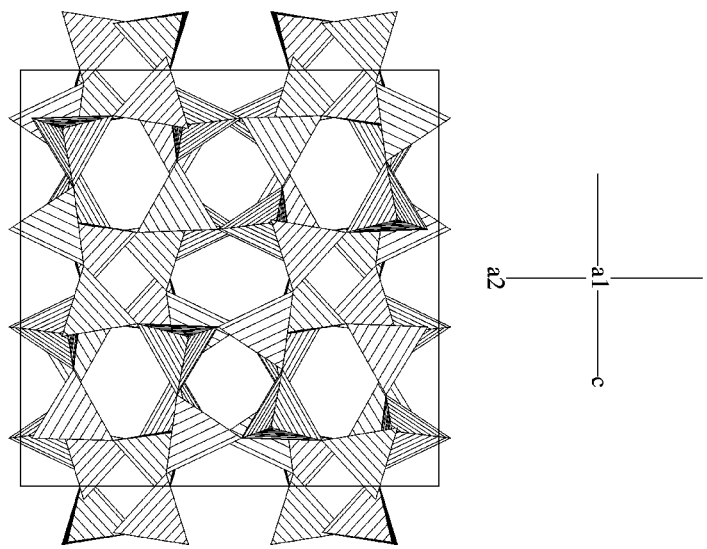
FIG. 1 shows different representations of the unit cell of a crystal with analcime structure, which can be used according to the invention: 1A along the a1 axis; 1B along the a2 axis; 1C along the c axis.
Figure 1B:
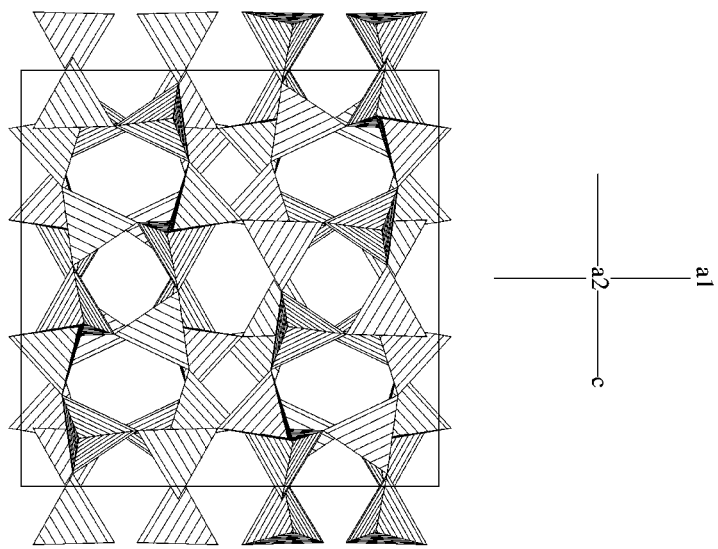
Figure 1C:
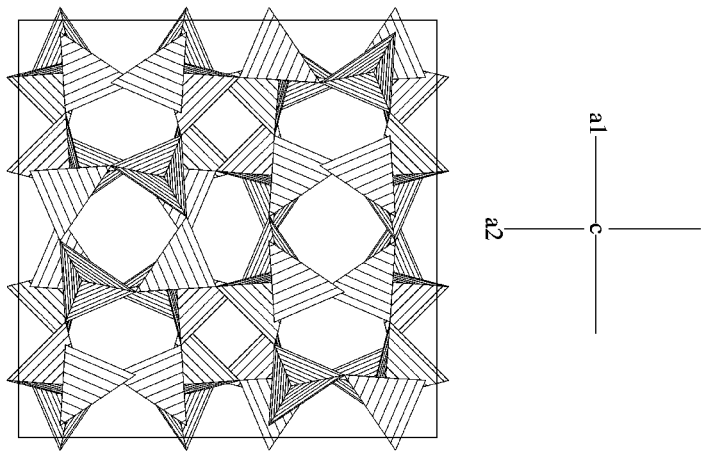
Figure 2A:
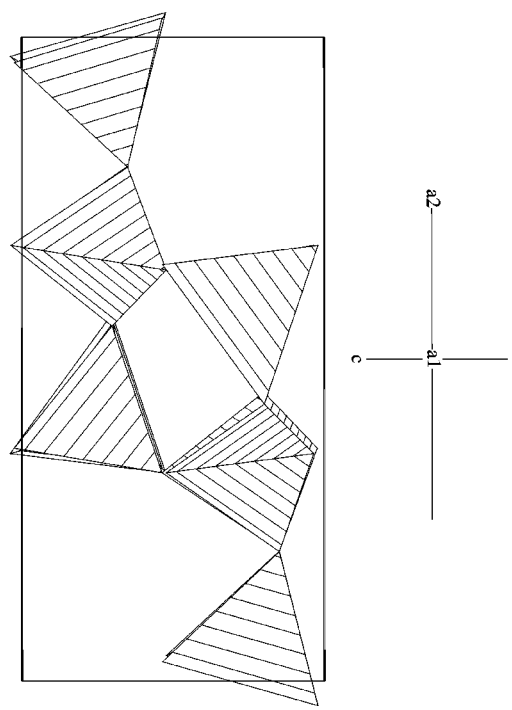
FIG. 2 shows different presentations of the unit cell of a crystal with cancrinite structure, which can be used according to the invention: 2A along the a1 axis; 2B along the a2 axis; 2C along the c axis.
Figure 2B:
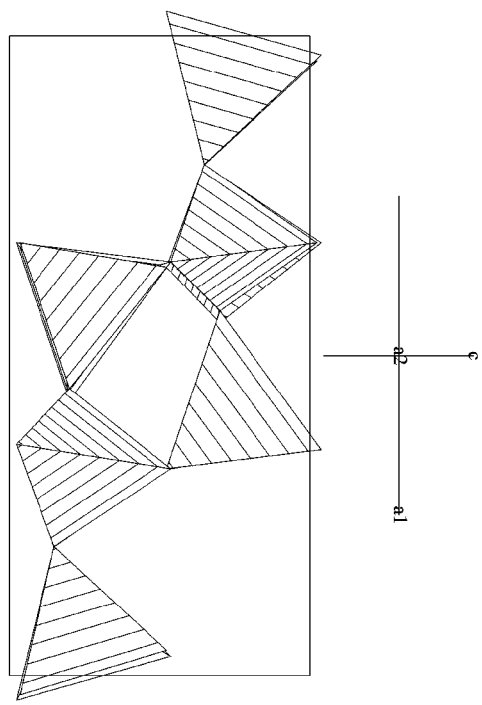
Figure 2C:
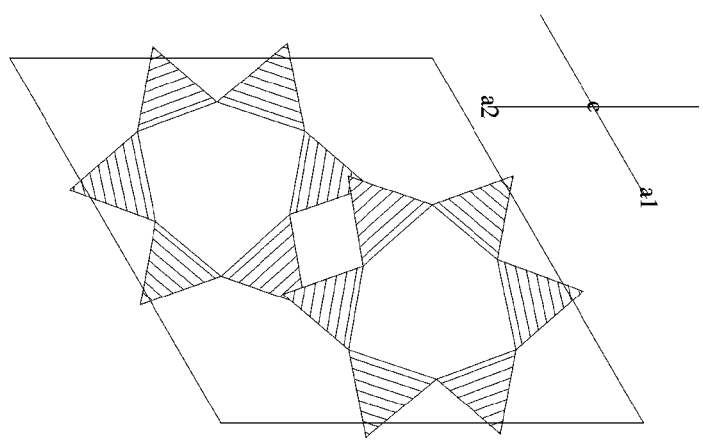
Figure 3A:
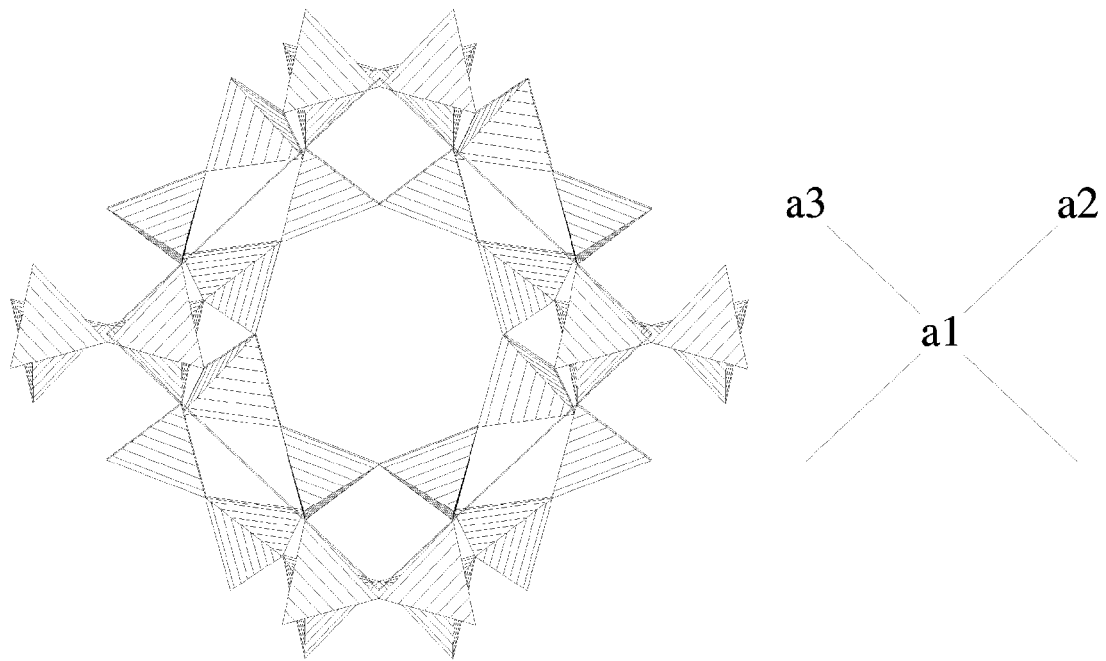
FIG. 3 shows different presentations of the unit cell of a crystal with chabasite structure, which can be used according to the invention: 3A along the a1 axis; 3B along the a1-a3 axis; 3C along the a2 axis; 3D along the space diagonal.
Figure 3B:
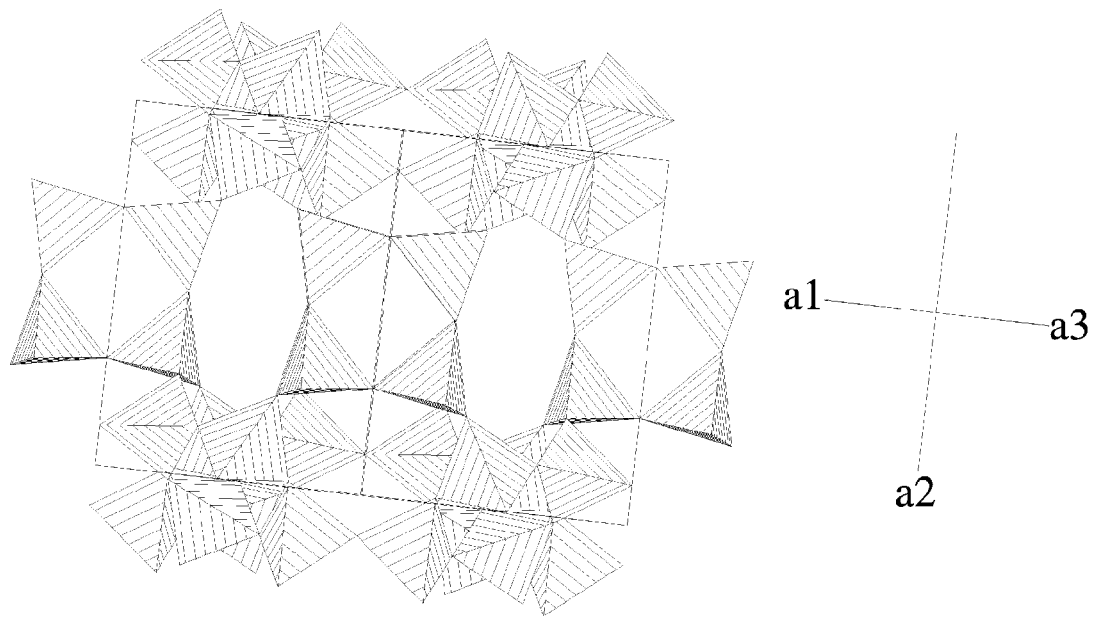
Figure 3C:
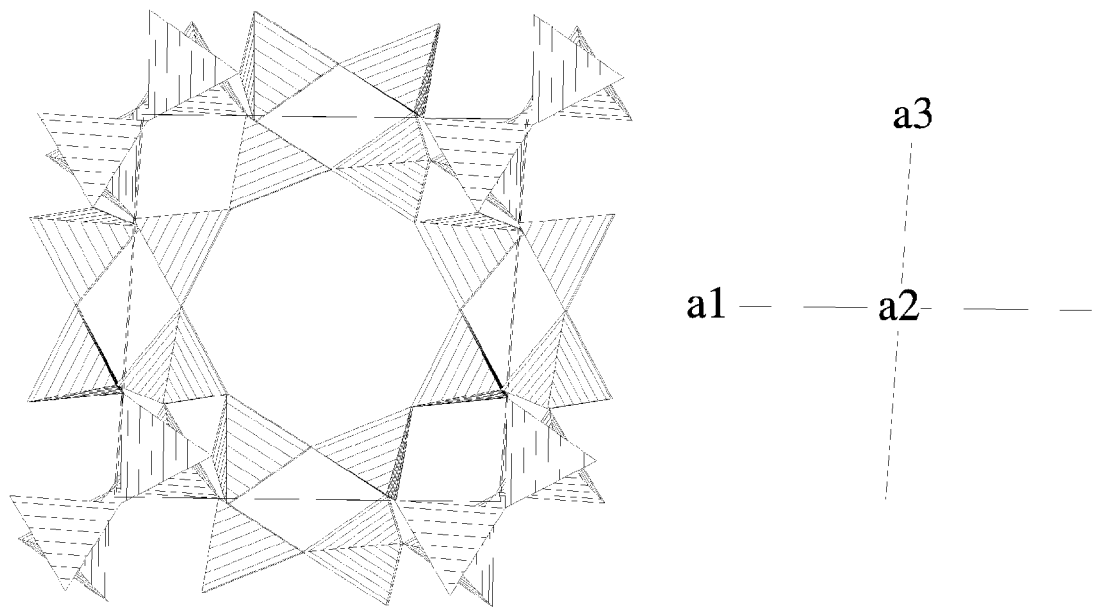
Figure 3D:
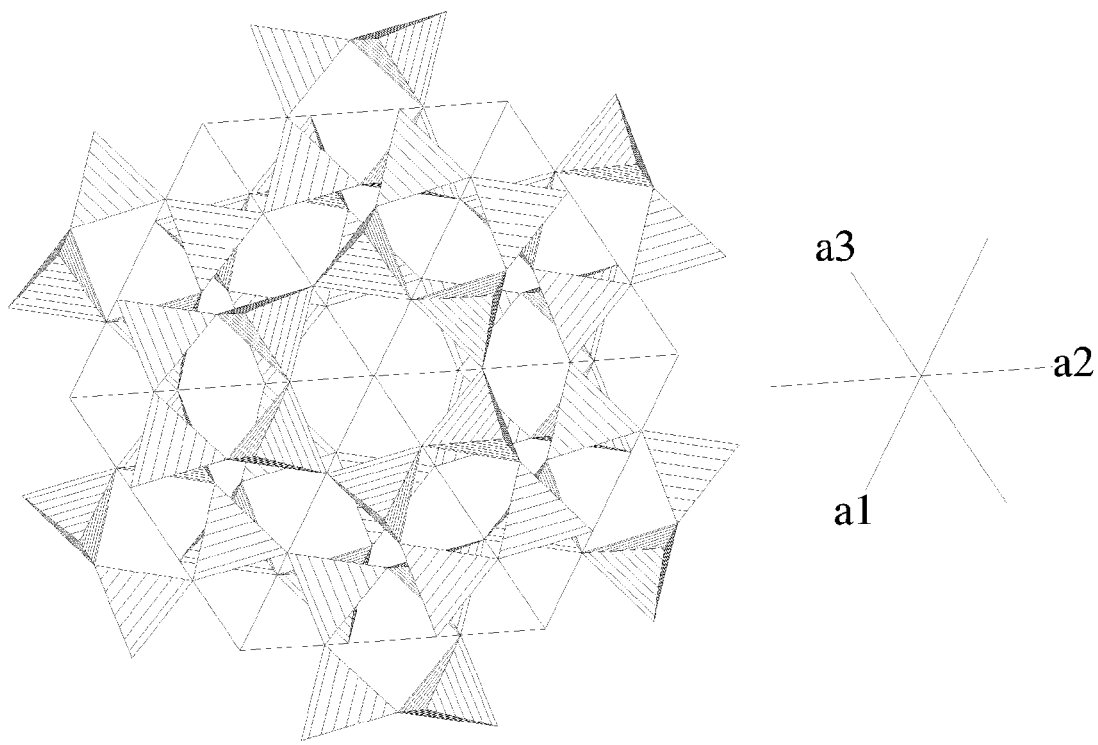
Figure 4A:
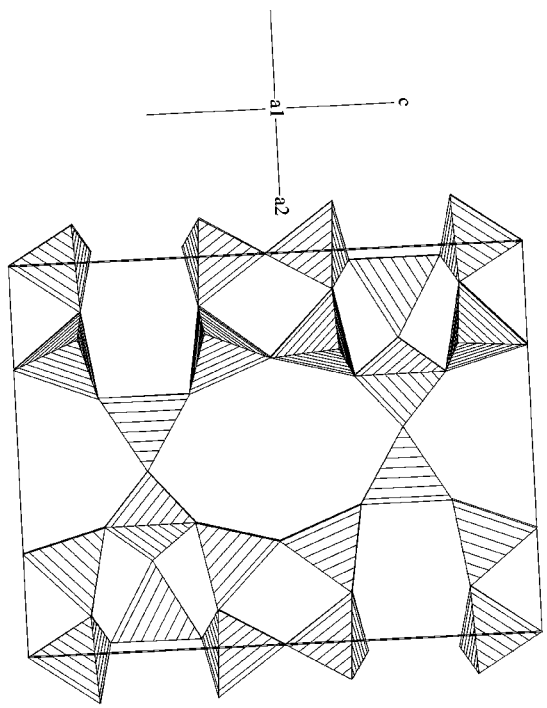
FIG. 4 shows different presentations of the unit cell of a crystal with erionite structure, which can be used according to the invention: 4A along the a1 axis; 4B along the a2 axis; 4C along the c axis.
Figure 4B:
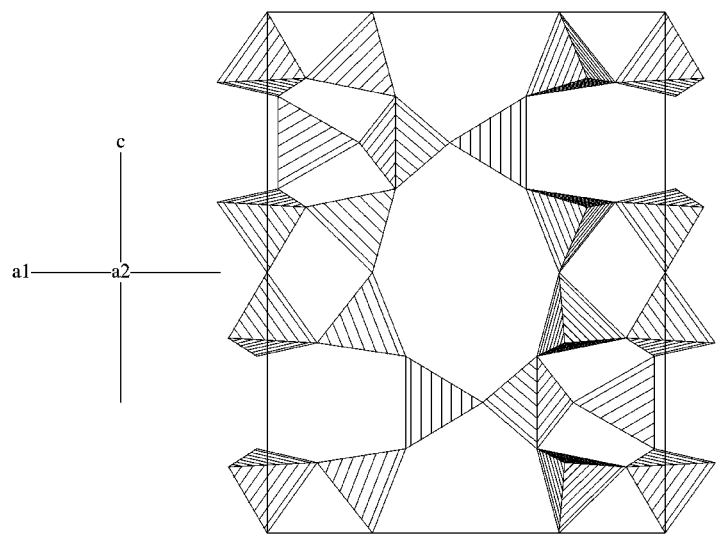
Figure 4C:
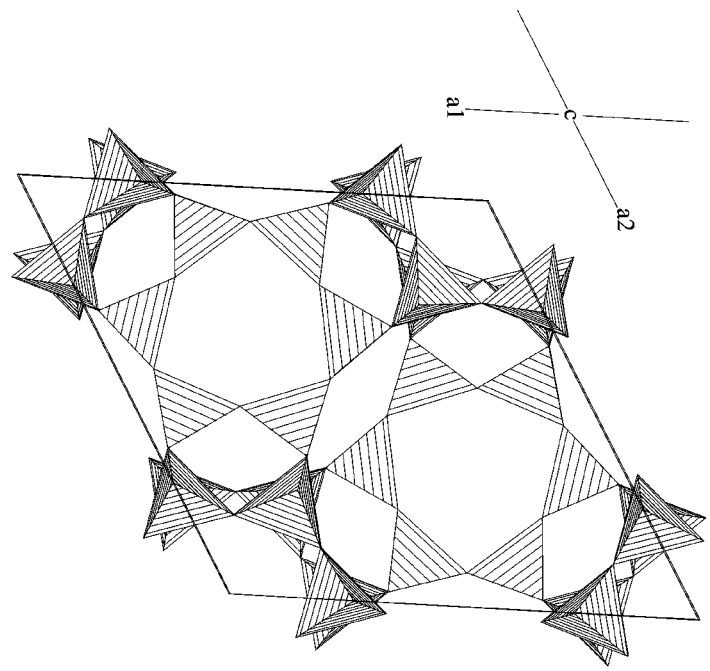
Figure 5A:
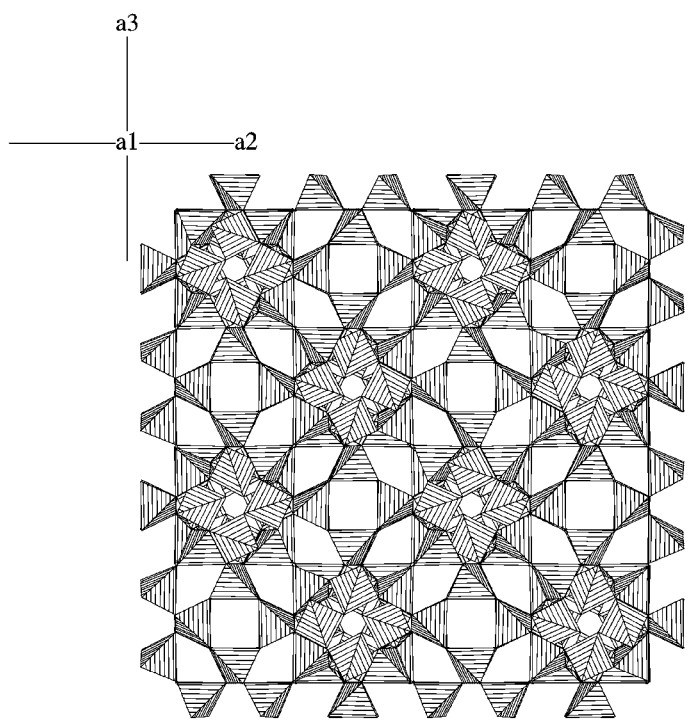
FIG. 5 shows different presentations of the unit cell of a crystal with faujasite structure, which can be used according to the invention: 5A along the a1 axis; 5B along the space diagonal; 5C along the cube edge.
Figure 5B:
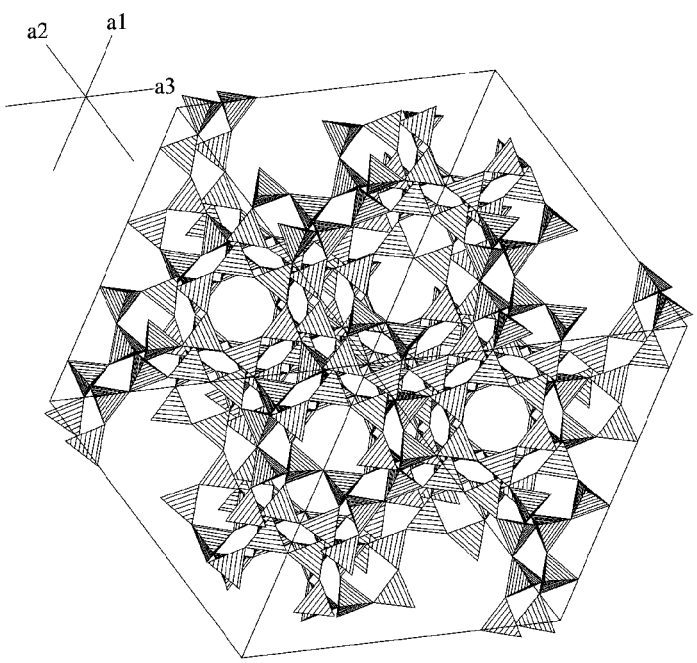
Figure 5C:
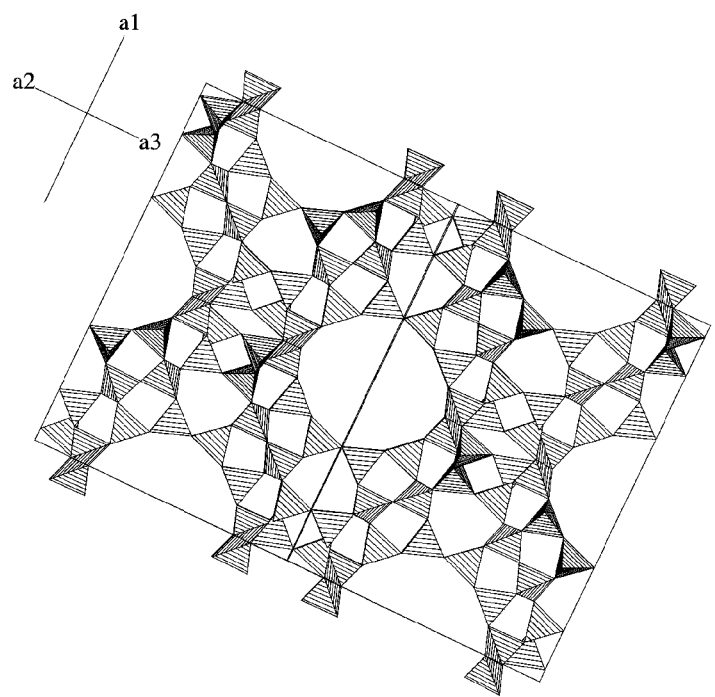
Figure 6A:
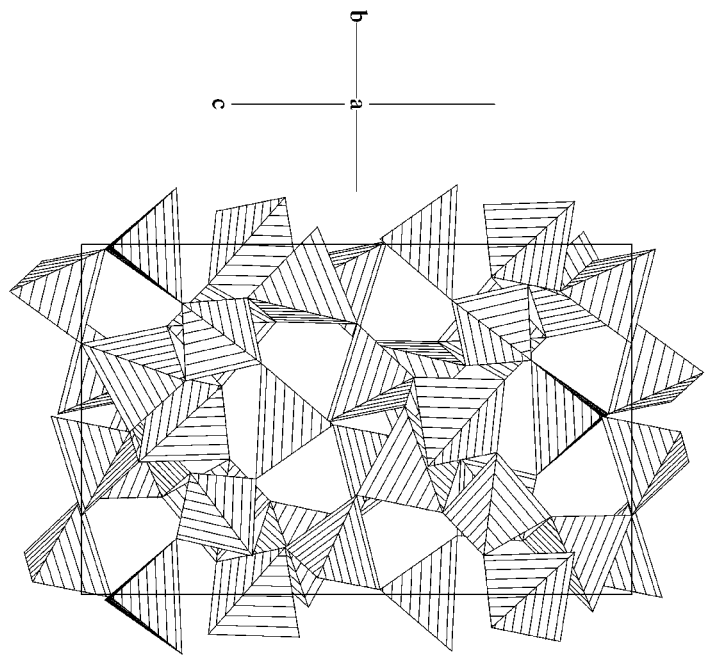
FIG. 6 shows different presentations of the unit cell of a crystal with gismondite structure, which can be used according to the invention: 6A along the a axis; 6B along the b axis; 6C along the c axis; 6D along the edge.
Figure 6B:
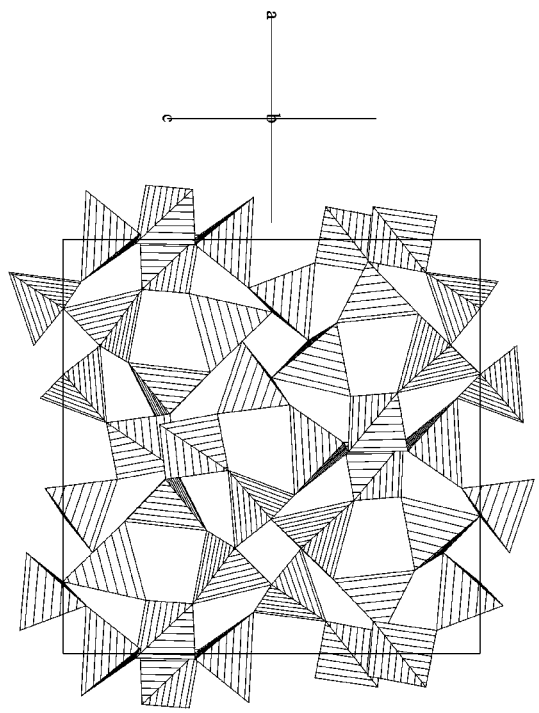
Figure 6C:
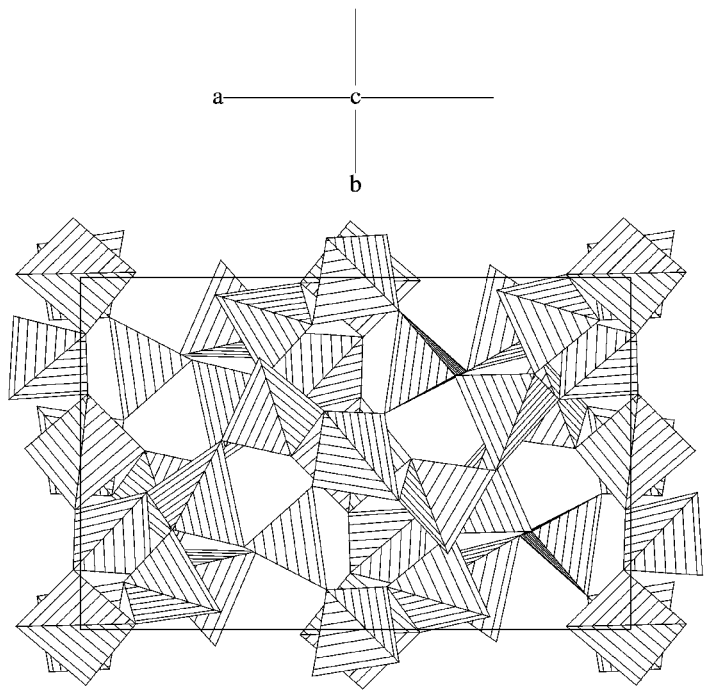
Figure 6D:
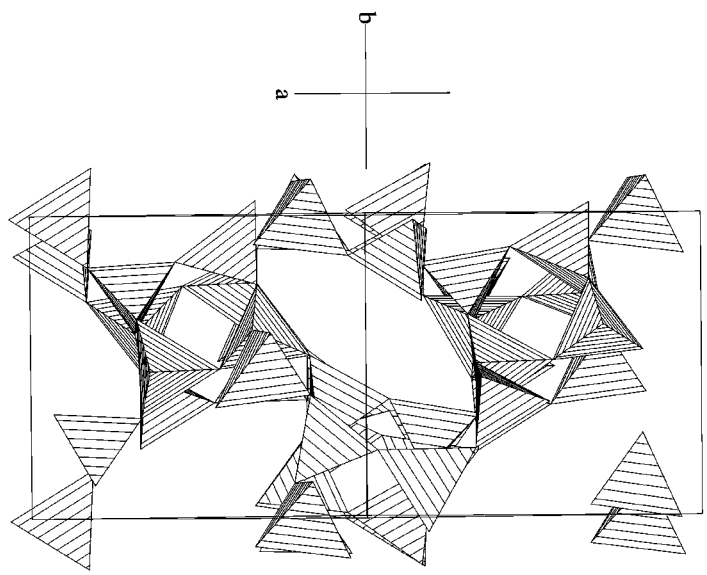
Figure 7A:
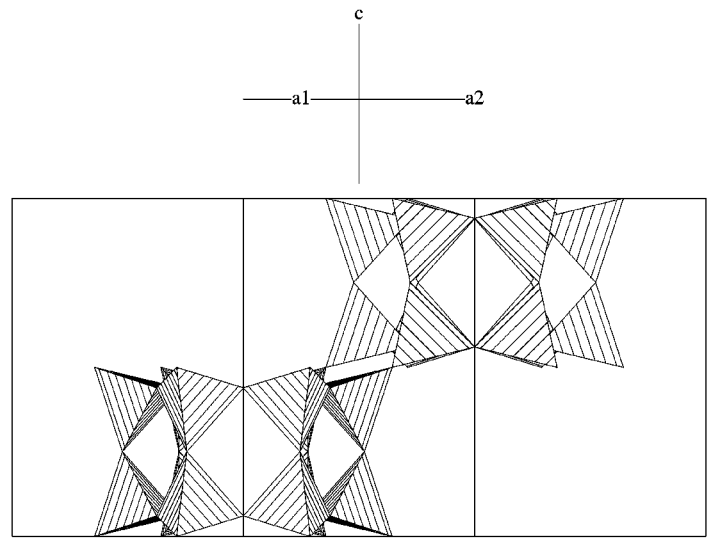
FIG. 7 shows different presentations of the unit cell of a crystal with gmelinite structure, which can be used according to the invention: 7A along the a1-a2 axis; 7B along the a2 axis; 7C along the c axis; 7D several elementary cells along the a2 axis.
Figure 7B:
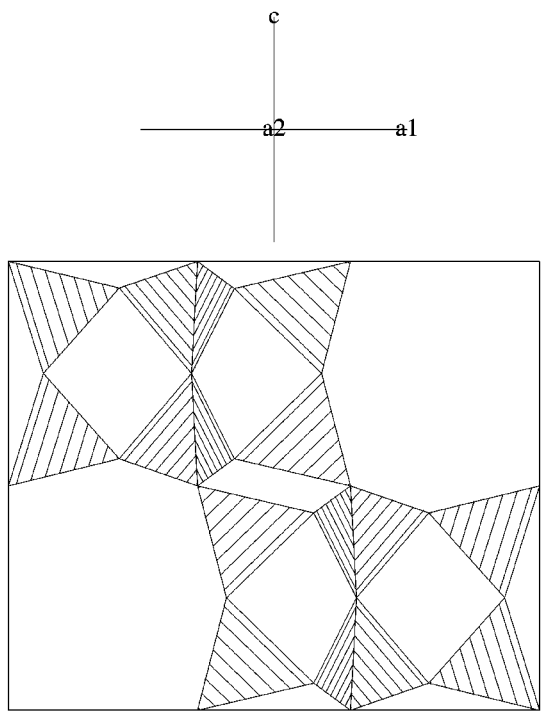
Figure 7C:
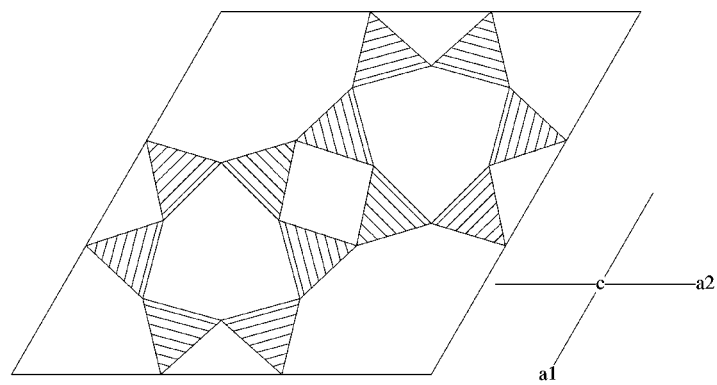
Figure 7D:
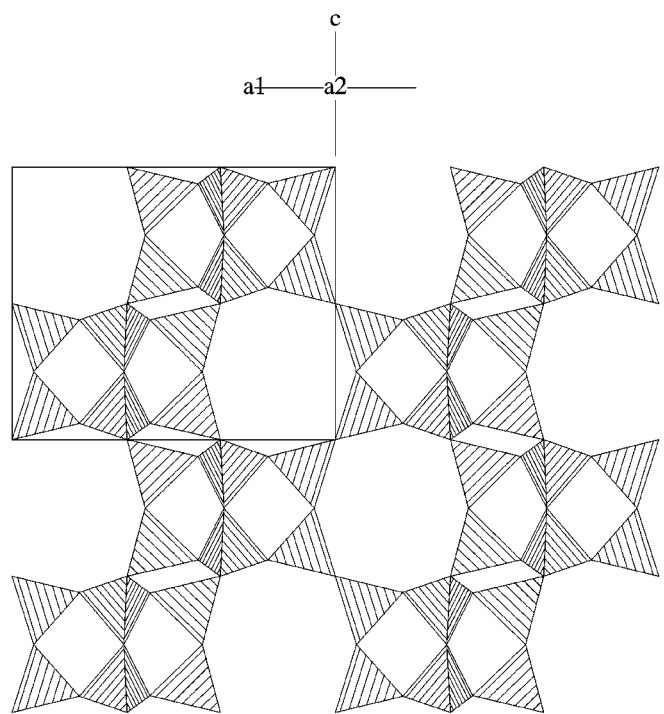
Figure 8A:
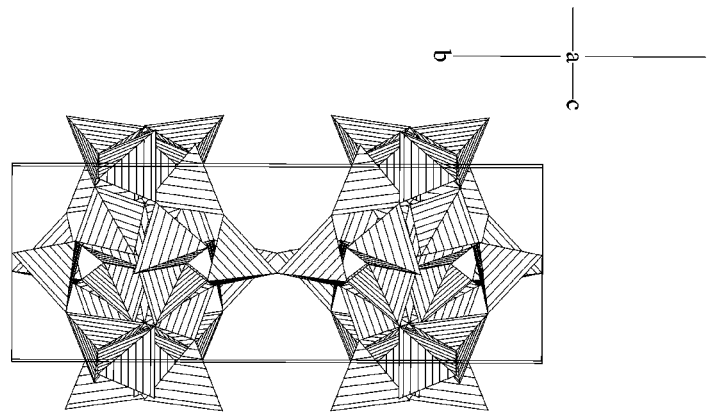
FIG. 8 shows different presentations of the unit cell of a crystal with heulandite structure, which can be used according to the invention: 8A along the a axis; 8B along the b axis; 8C along the c axis; 8D along one edge; 8E along a second edge.
Figure 8B:
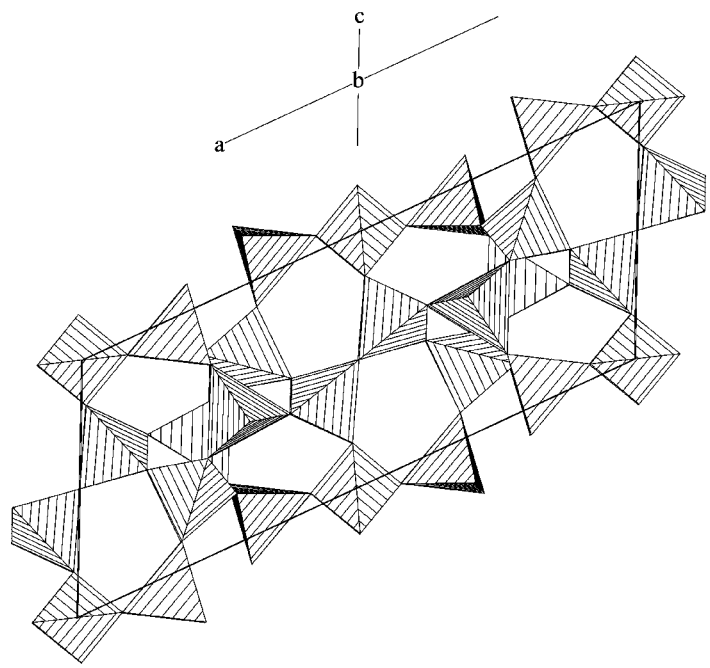
Figure 8C:
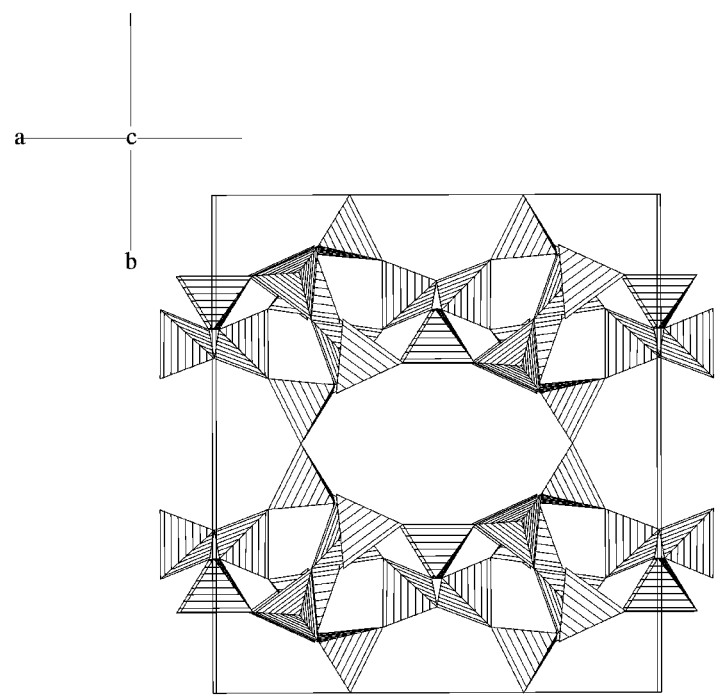
Figure 8D:
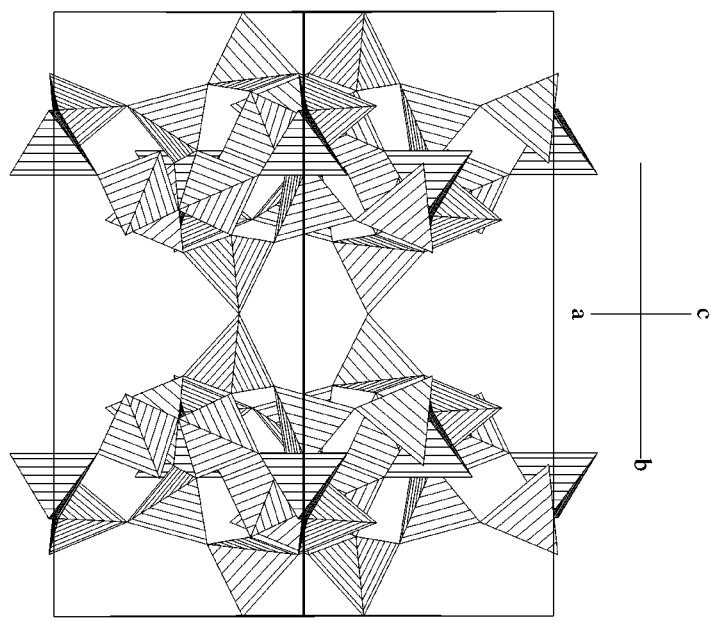
Figure 8E:
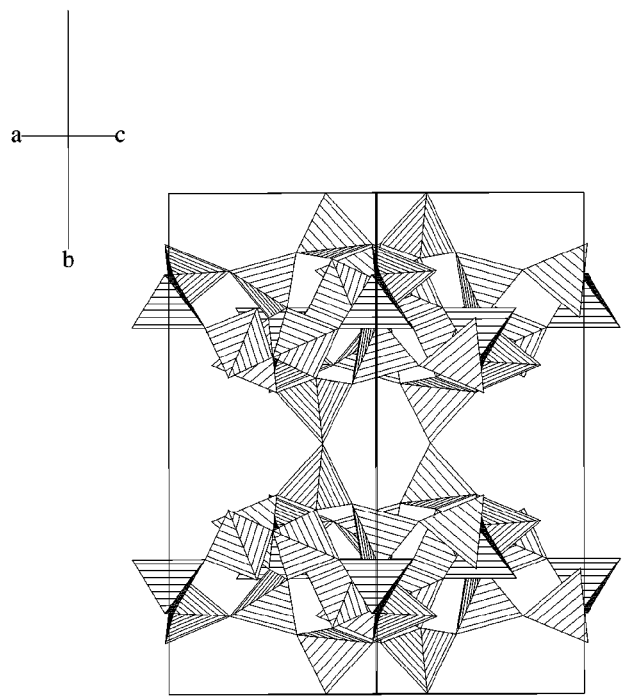
Figure 9A:
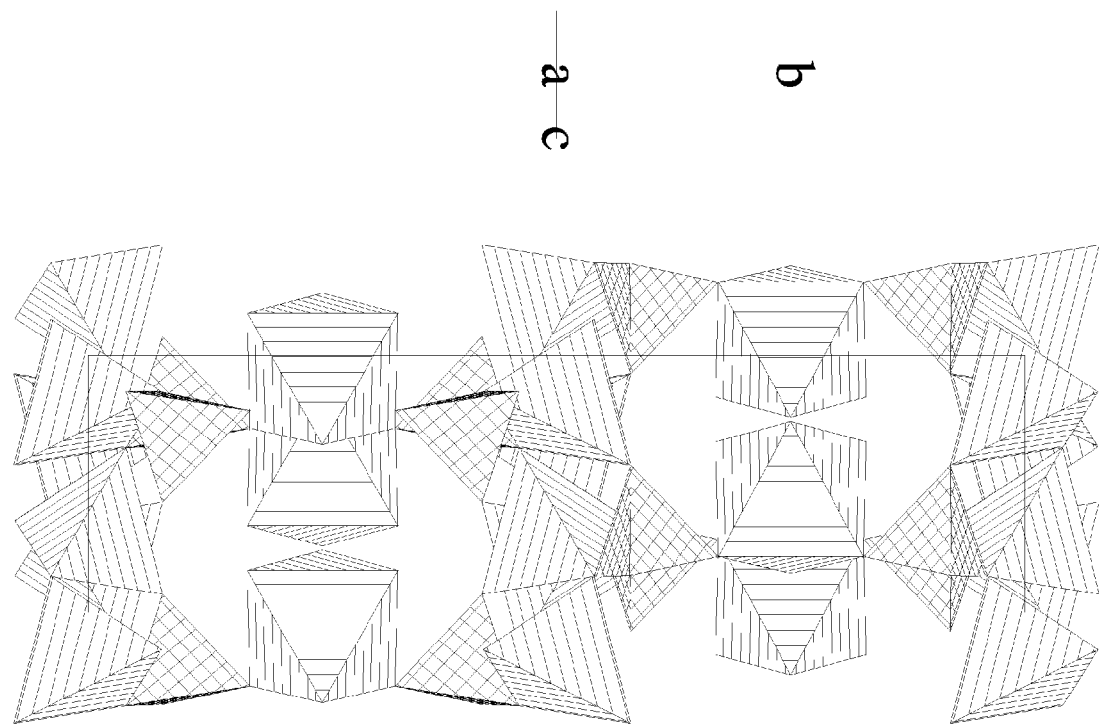
FIG. 9 shows different presentations of the unit cell of a crystal with hopeite structure, which can be used according to the invention: 9A along the a axis; 9B along the b axis; 9C along the c axis. The $MO_4$ coordination polyhedrons are represented chequered, the coordination polyhedrons of the structure-building elements are represented lined.
Figure 9B:
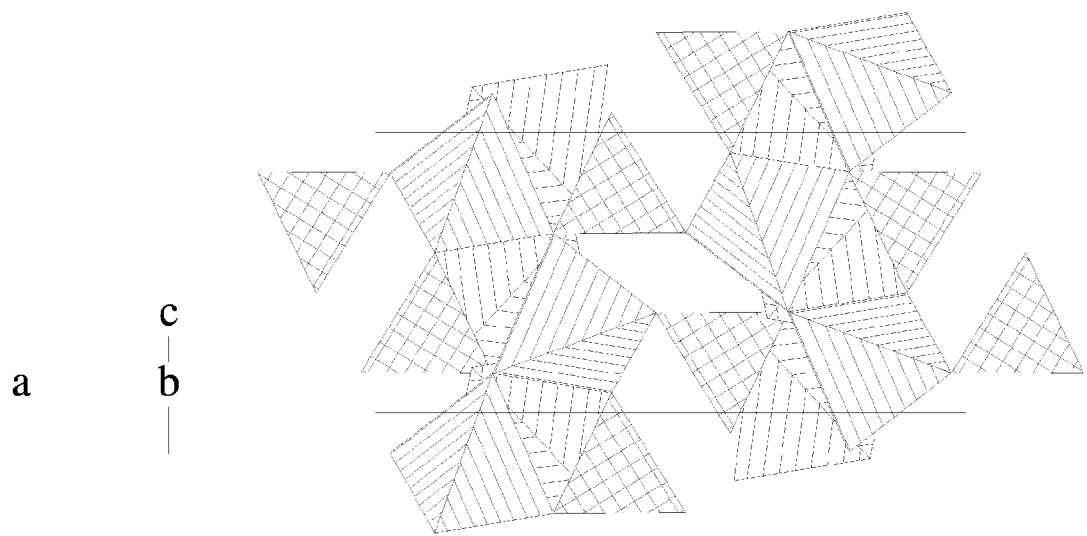
Figure 9C:
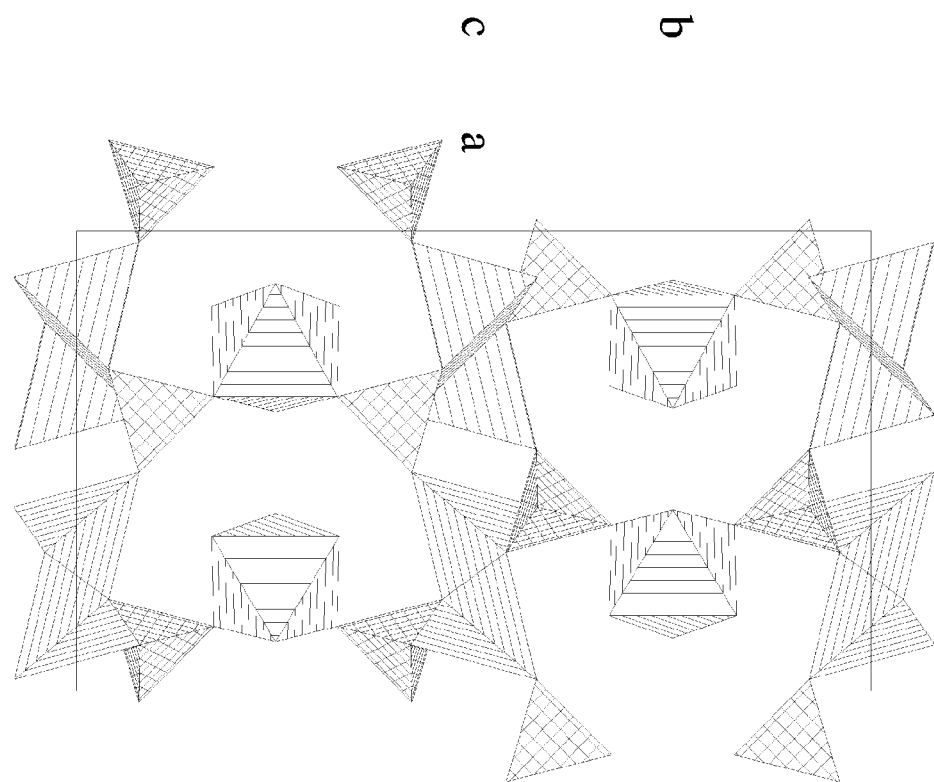
Figure 10A:
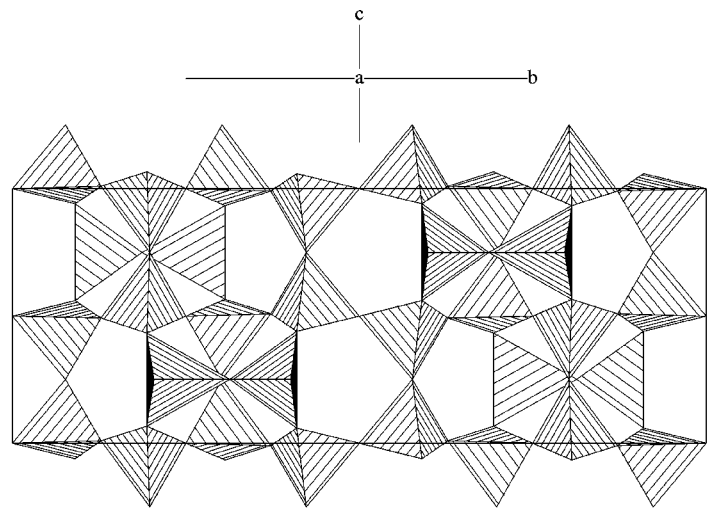
FIG. 10 shows different presentations of the unit cell of a crystal with mordenite structure, which can be used according to the invention: 10A along the a axis; 10B along the b axis; 10C along the c axis.
Figure 10B:
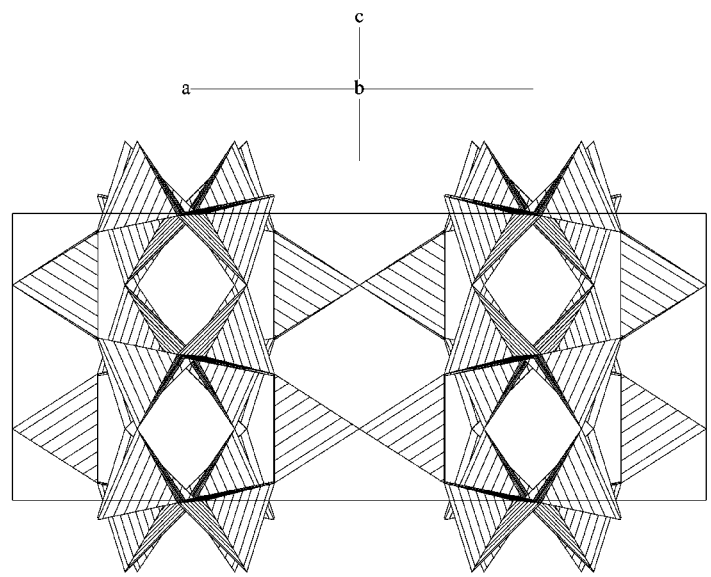
Figure 10C:
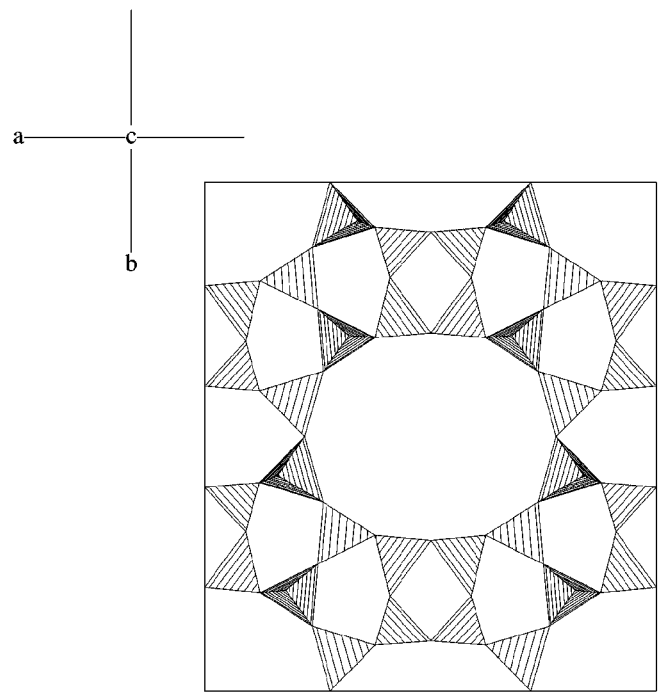
Figure 11A:
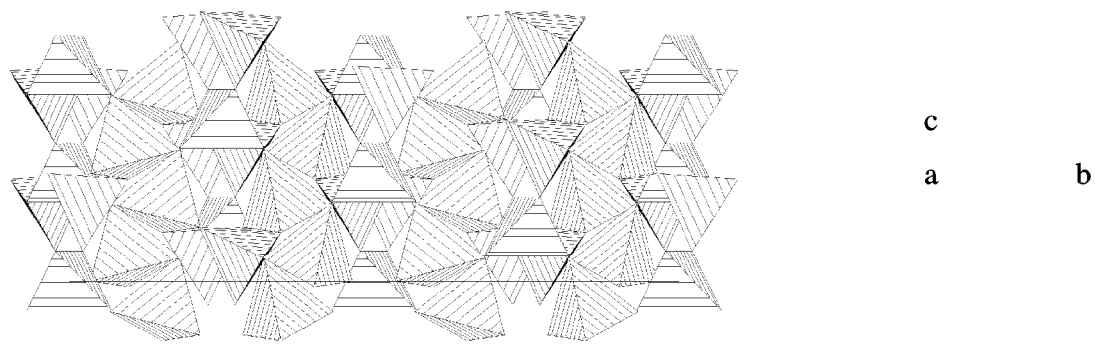
FIG. 11 shows different presentations of the unit cell of a crystal with natrolite structure, which can be used according to the invention: 11A along the a axis; 11B along the b axis; 11C along the c axis.
Figure 11B:
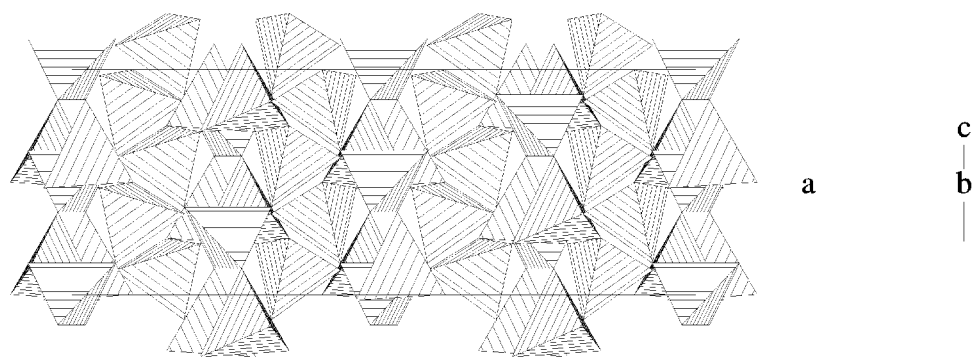
Figure 11C:
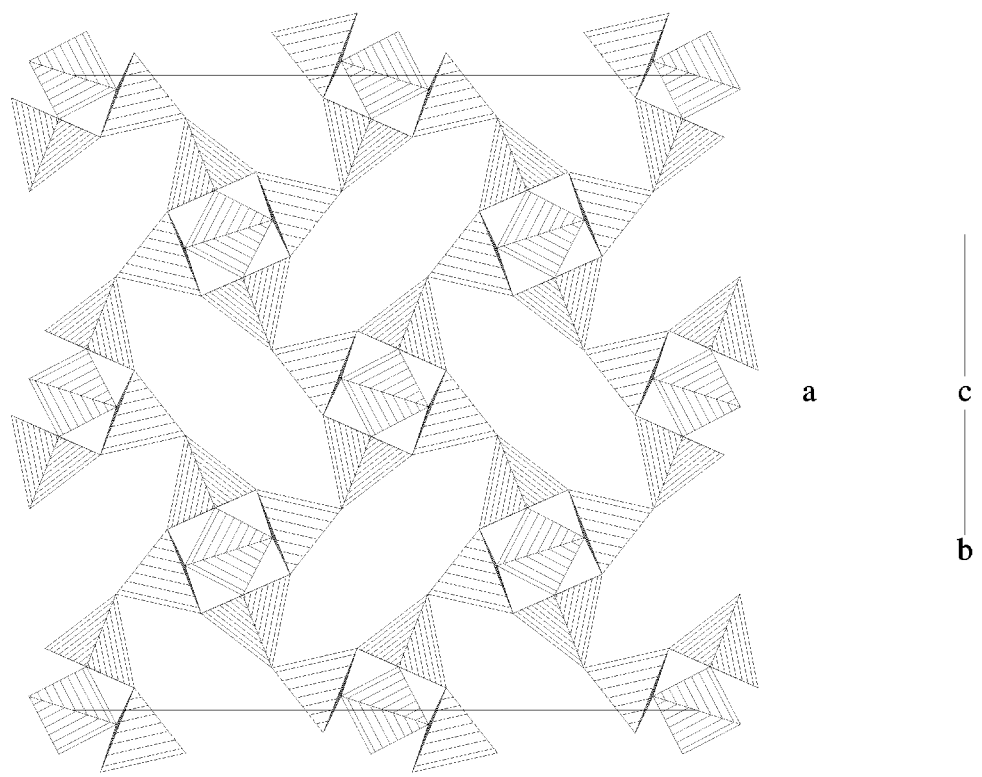
Figure 12A:
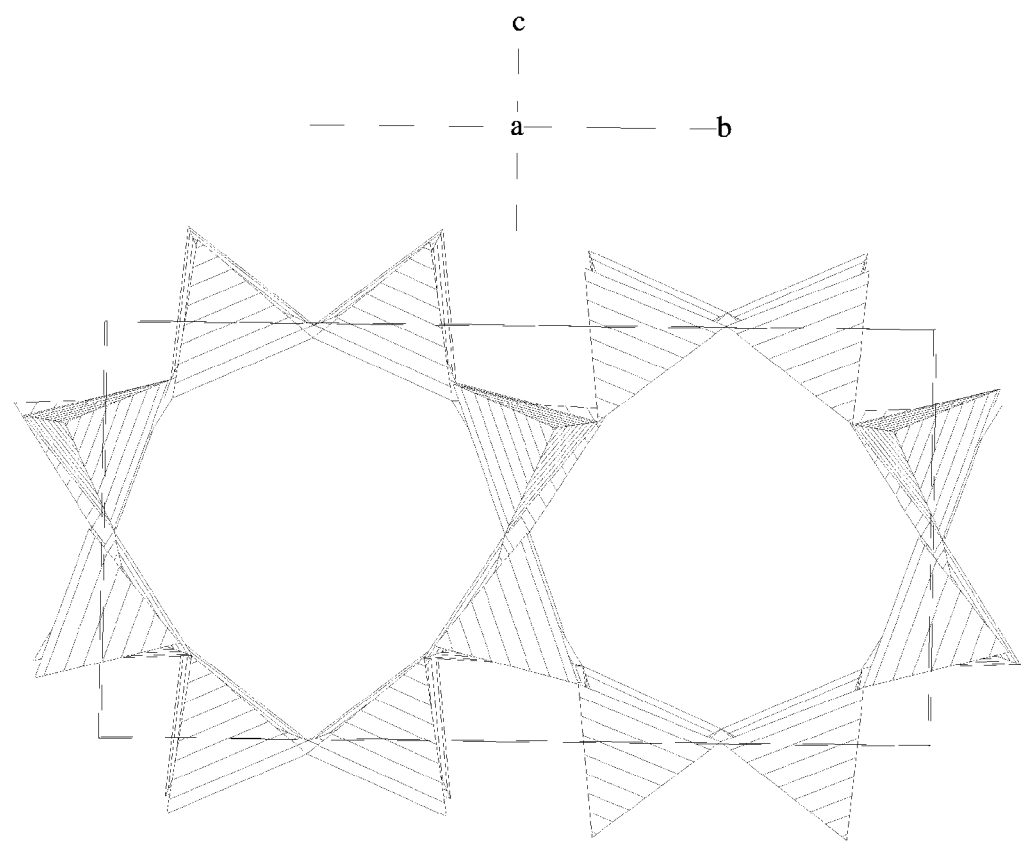
FIG. 12 shows different presentations of the unit cell of a crystal with phillipsite structure, which can be used according to the invention: 12A along the a axis; 12B along the a-c axis; 12C along the b axis; 12D along the c axis.
Figure 12B:
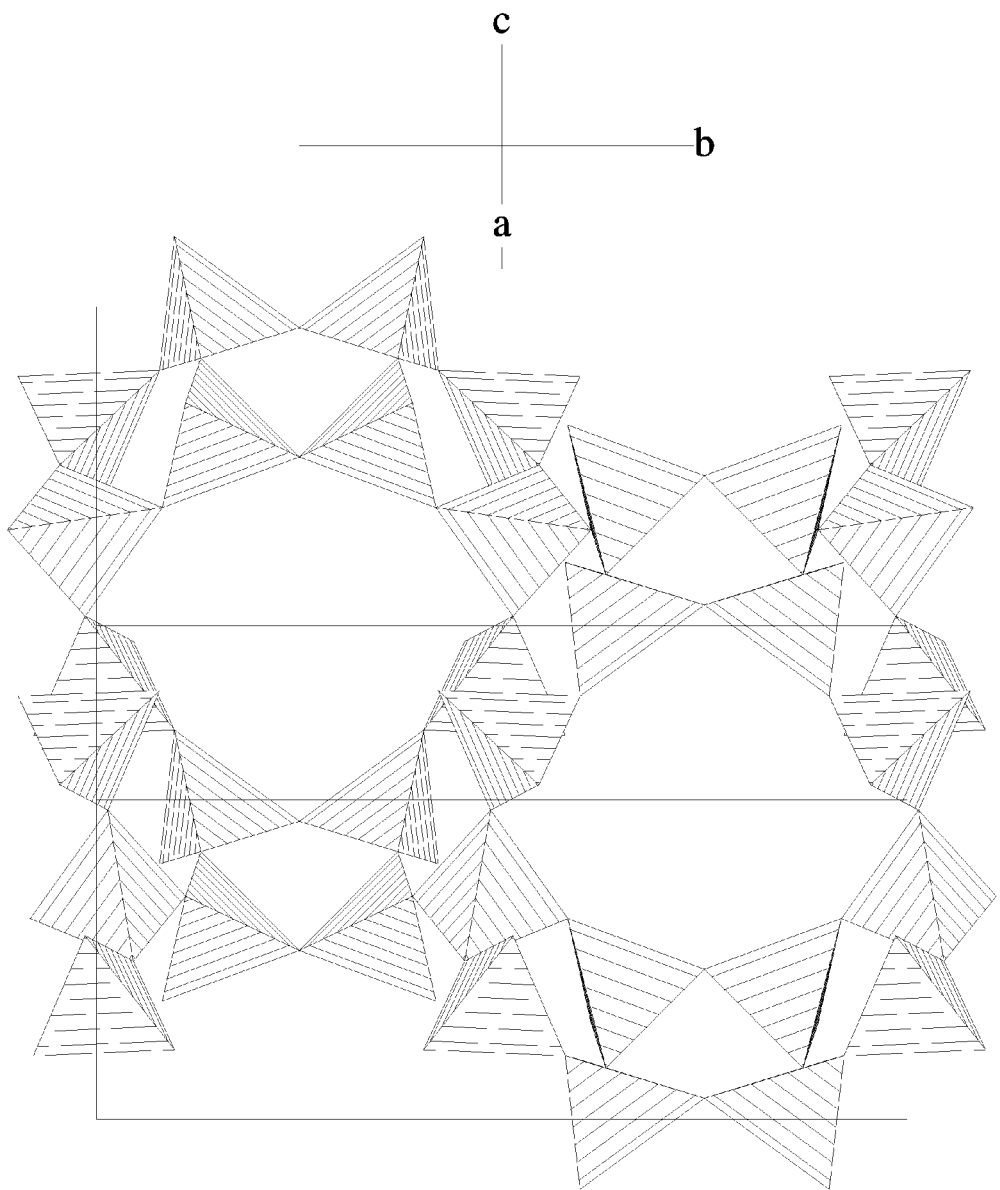
Figure 12C:
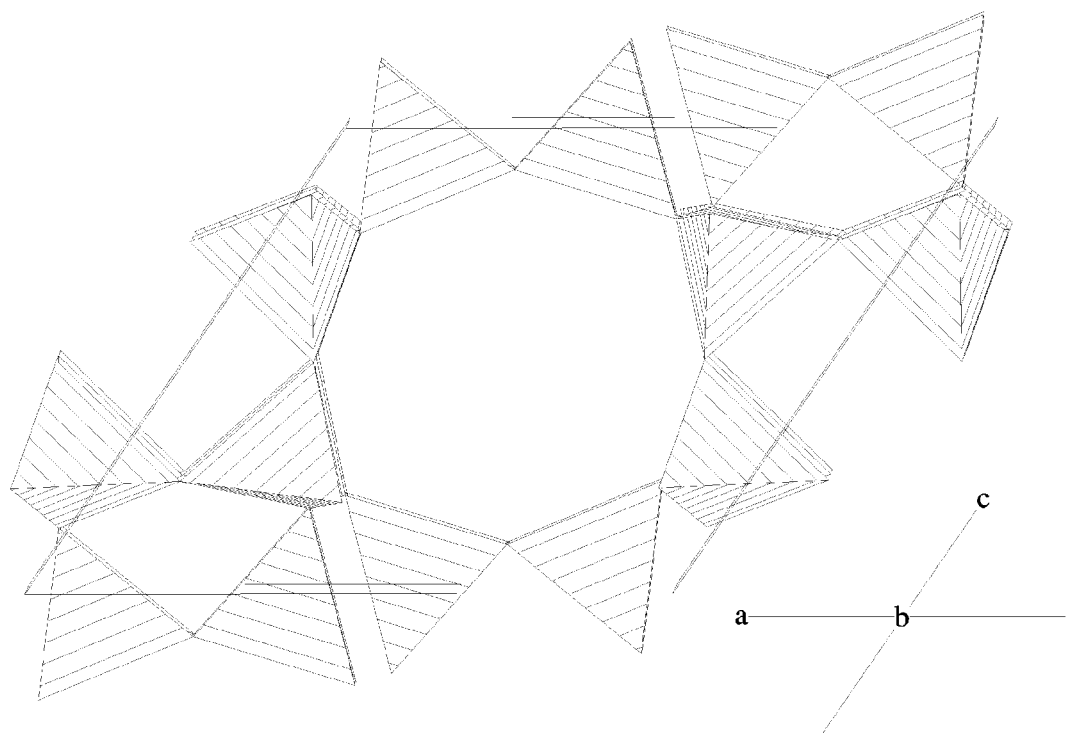
Figure 12D:
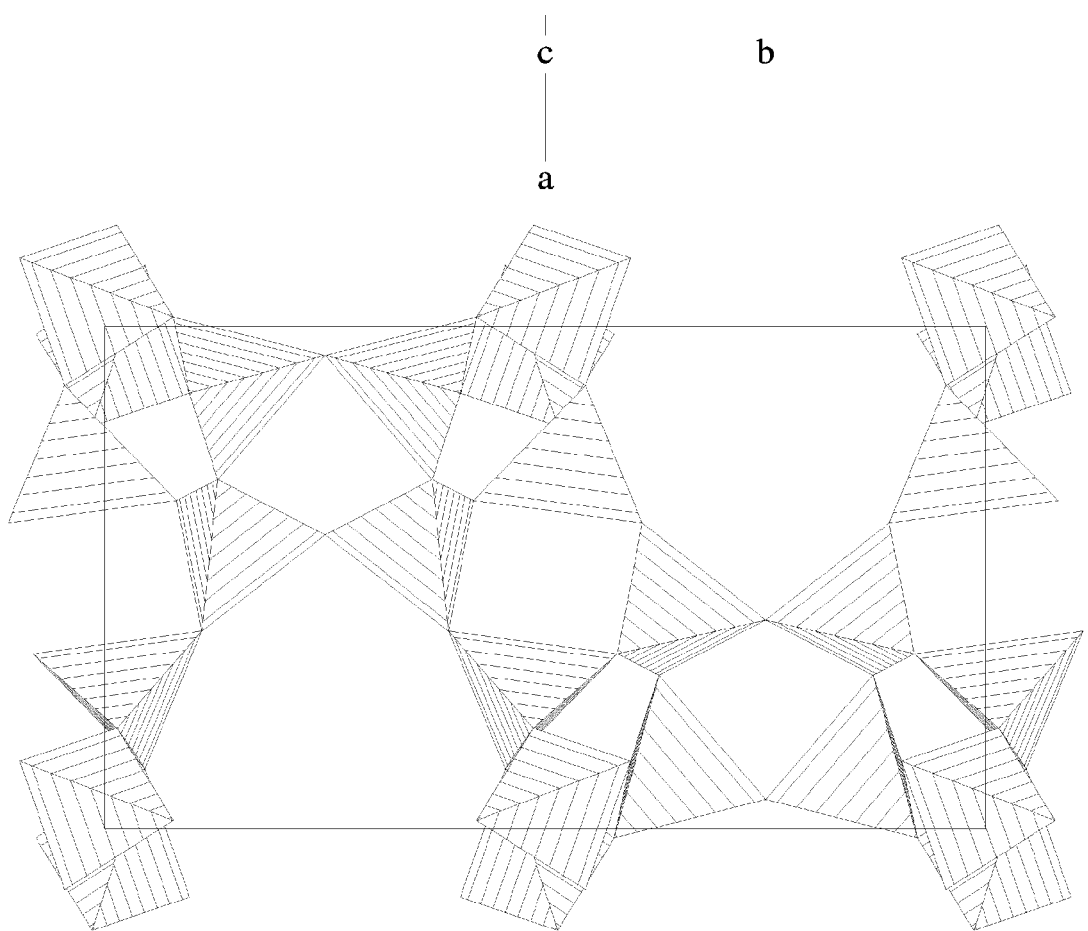
Figure 13A:
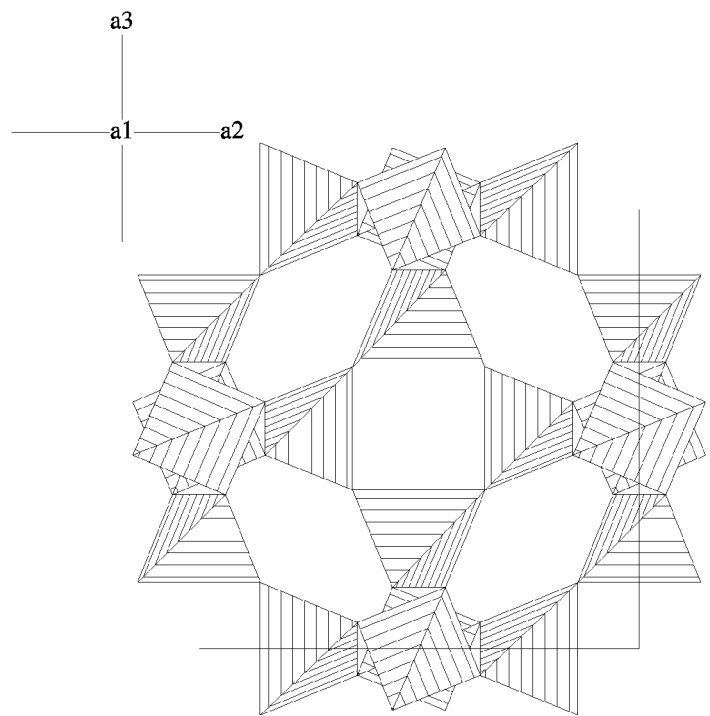
FIG. 13 shows different presentations of the unit cell of a crystal with sodalite structure, which can be used according to the invention: 13A along the a1 axis; 13B along the a2 axis; 13C along the a3 axis; 13D along an edge; 13E along the space diagonal.
Figure 13B:
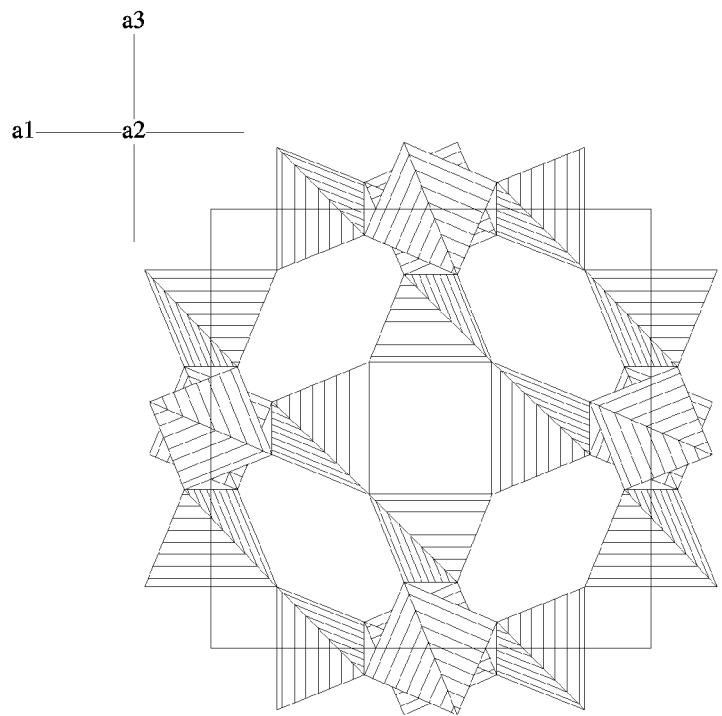
Figure 13C:
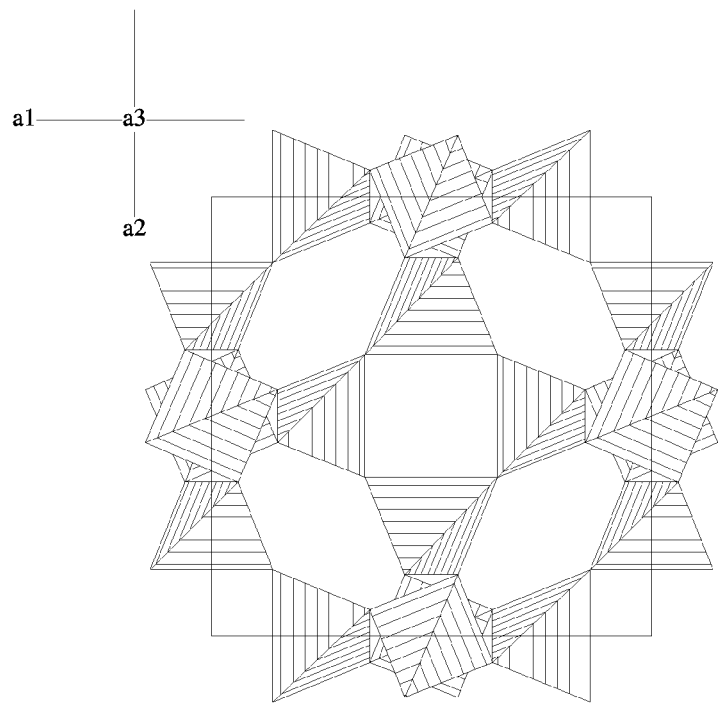
Figure 13D:
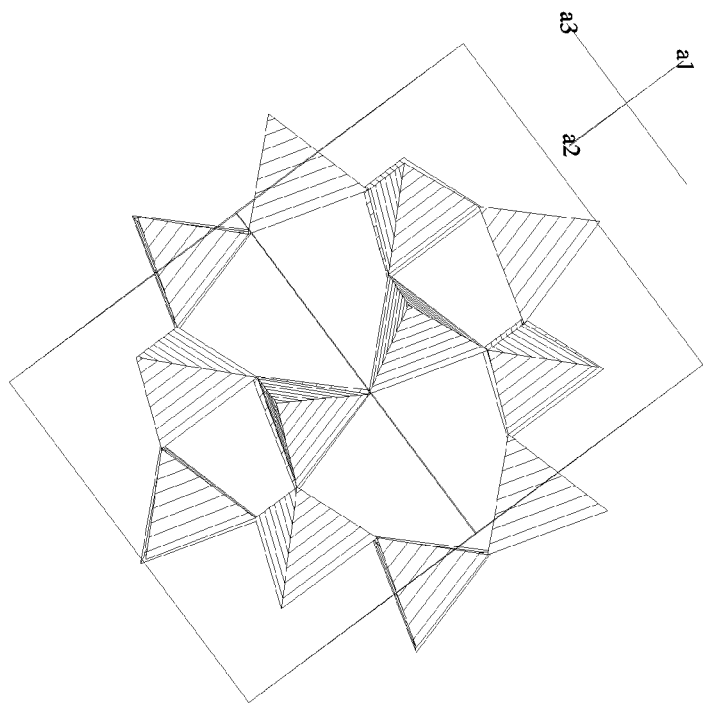
Figure 13E:
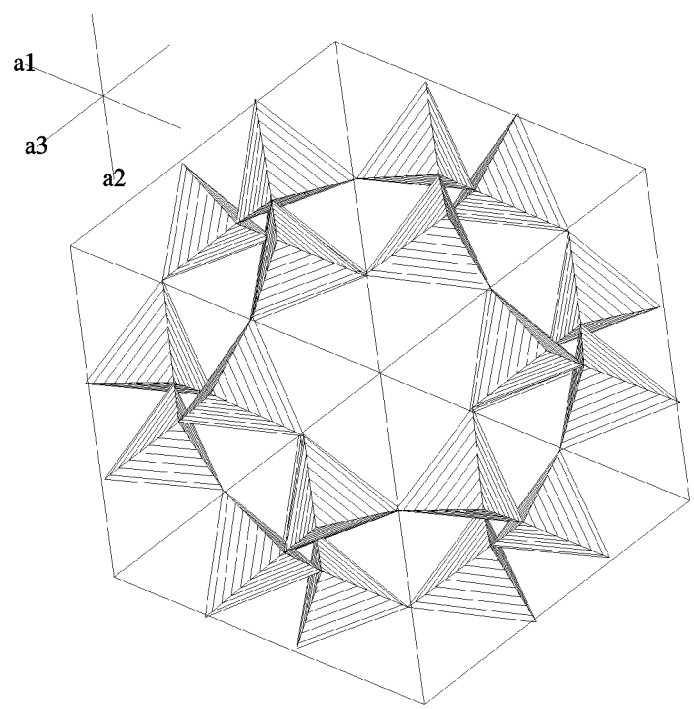
Figure 14:
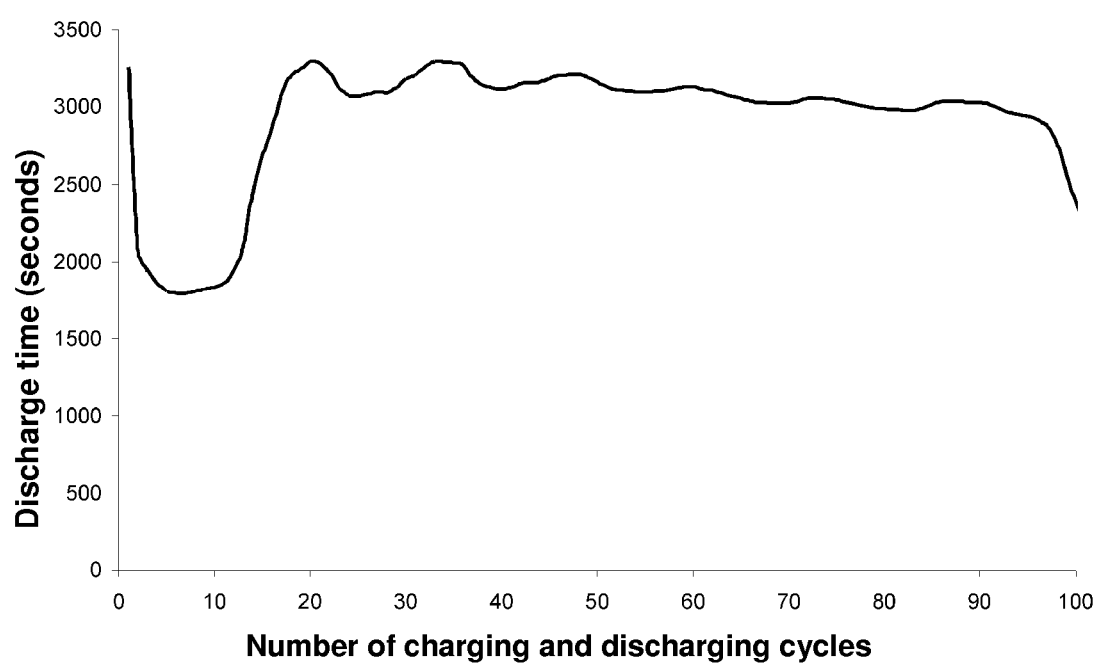
FIG. 14 shows the evolution of the discharge time, which is plotted as a function of the number of the discharging and charging cycles, of a lithium ion battery with analcime cathode according to the invention.

A zeolite with analcime structure was charged as in Example 2 with Li and was used as a cathode in a lithium ion battery with the same setup as in Example 2. FIG. 14 shows the stable evolution of the discharging time, which is plotted as a function of the number of the discharging and charging cycles, of this battery in the course of more than hundred cycles and demonstrates that a deep discharge in the range of 0.05 V-3.61 V has been achieved.

EXAMPLE 5

Figure 15:
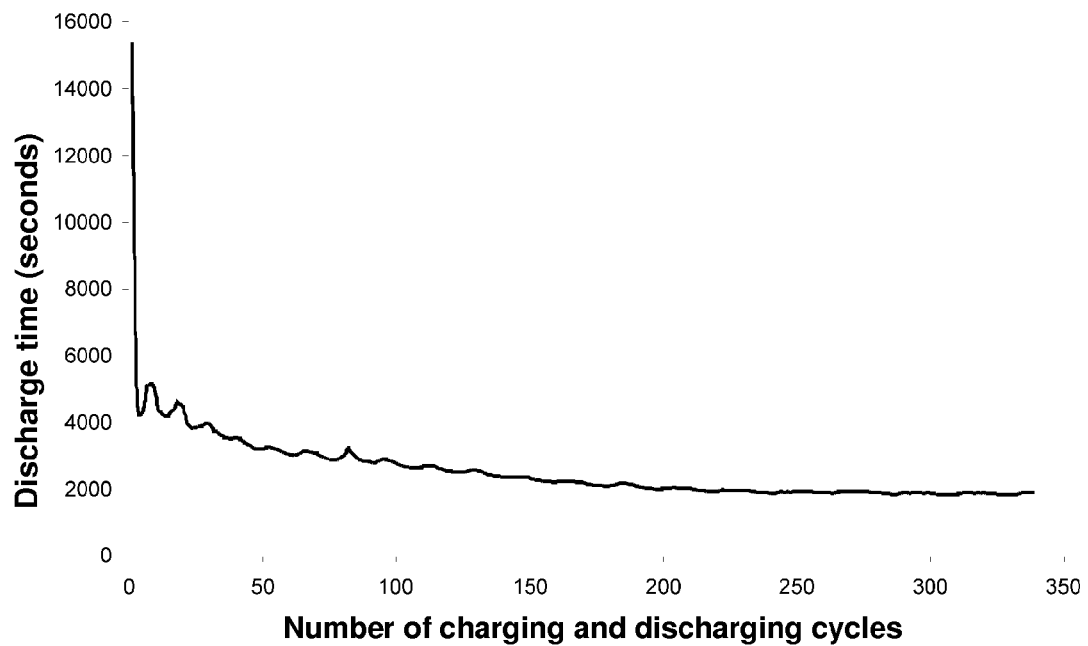
FIG. 15 shows the evolution of the discharge time, which is plotted as a function of the number of the discharging and charging cycles, of a lithium ion battery with chabasite cathode according to the invention.

A zeolite with chabasite structure was charged as in Example 2 with Li and was used as a cathode in a lithium ion battery with the same setup as in Example 2. FIG. 15 shows the stable evolution of the discharging time, which is plotted as a function of the number of the discharging and charging cycles, of this battery in the course of several hundred cycles and demonstrates that a deep discharge in the range of 0.05 V-3.61 V has been achieved.

EXAMPLE 6

Figure 17:
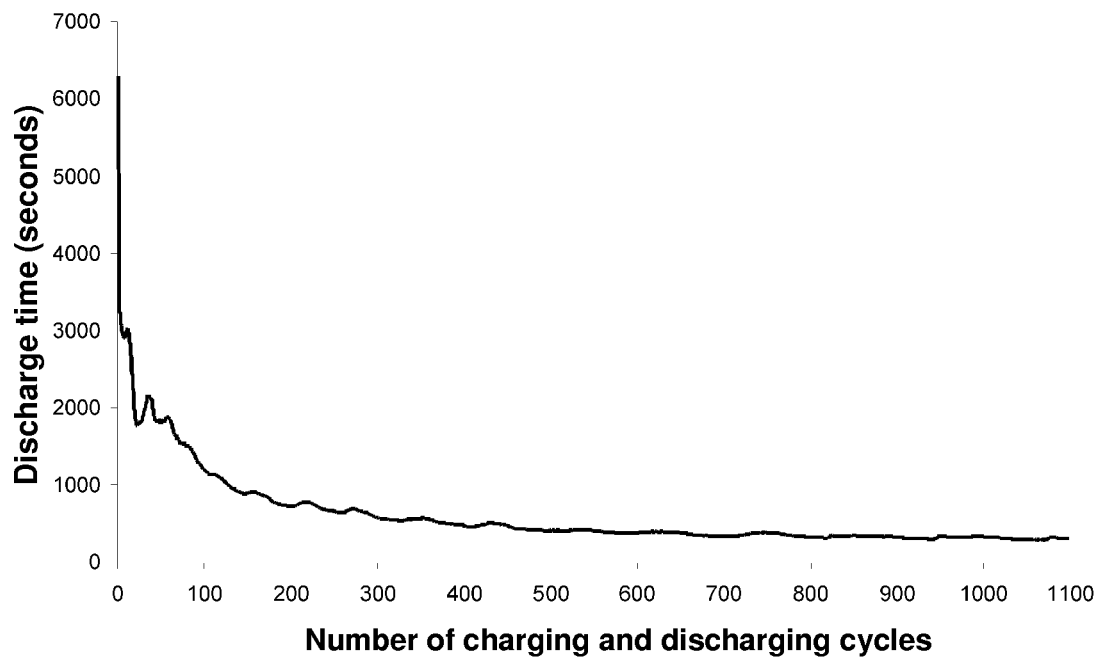
FIG. 17 shows the evolution of the discharge time, which is plotted as a function of the number of the discharging and charging cycles, of a lithium ion battery with natrolite cathode according to the invention.

A zeolite with natrolite structure was charged as in Example 2 with Li and was used as a cathode in a lithium ion battery with the same setup as in Example 2. FIG. 17 shows the stable evolution of the discharging time, which is plotted as a function of the number of the discharging and charging cycles, of this battery in the course of several hundred cycles and demonstrates that a deep discharge in the range of 0.05 V-3.61 V has been achieved.

EXAMPLE 7

Figure 18:
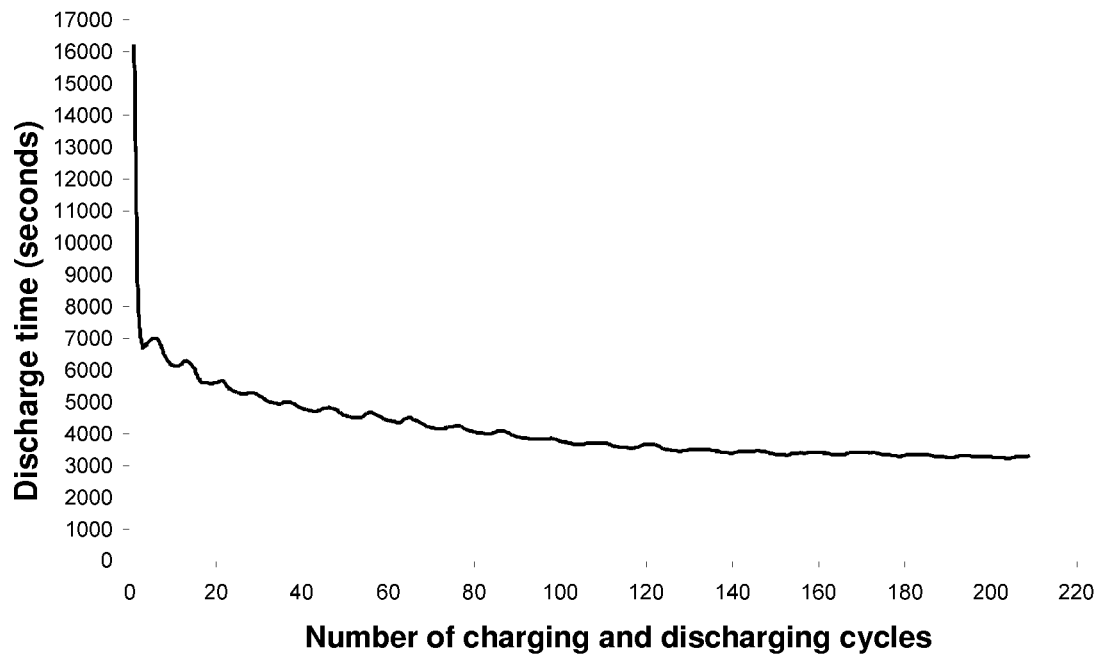
FIG. 18 shows the evolution of the discharge time, which is plotted as a function of the number of the discharging and charging cycles, of a lithium ion battery with sodalite cathode according to the invention.

A zeolite with sodalite structure was charged as in Example 2 with Li and was used as a cathode in a lithium ion battery with the same setup as in Example 2. FIG. 18 shows the stable evolution of the discharging time, which is plotted as a function of the number of the discharging and charging cycles, of this battery in the course of several hundred cycles and demonstrates that a deep discharge in the range of 0.05 V-3.61 V has been achieved.

EXAMPLE 8

A copper foil (thickness 0.1 mm, diameter 10 mm) was coated with hopeite, analogous to the description by Chung, S.-Y. et al. in *Nature Mat.* 2002, 1, 123-128, and was used as a cathode in a lithium ion battery with the same principal setup as in Example 2. FIG. 19 shows the stable evolution of the discharge time, which is plotted as a function of the number of the discharging and charging cycles, of this battery through several hundred cycles and demonstrates that a deep discharge in the range of 0.05 V-3.61 V has been achieved.

EXAMPLE 9

Figure 20:
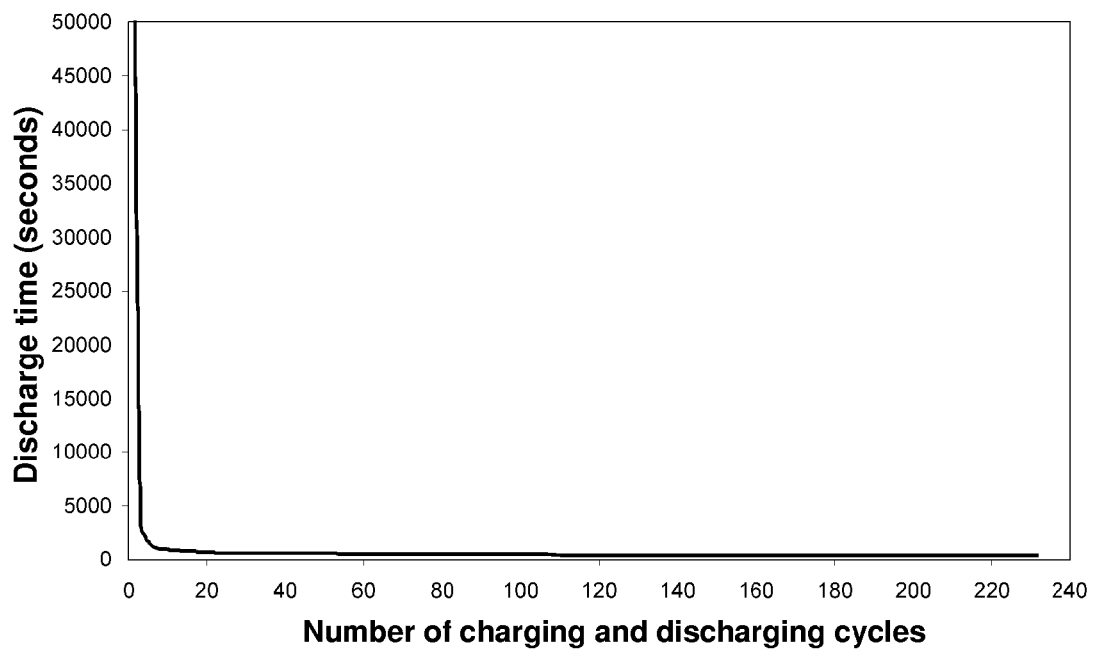
FIG. 20 shows the evolution of the discharge time, which is plotted as a function of the number of the discharging and charging cycles, of a lithium ion battery with hopeite cathode on a phosphatized steel sheet.
Figure 21:
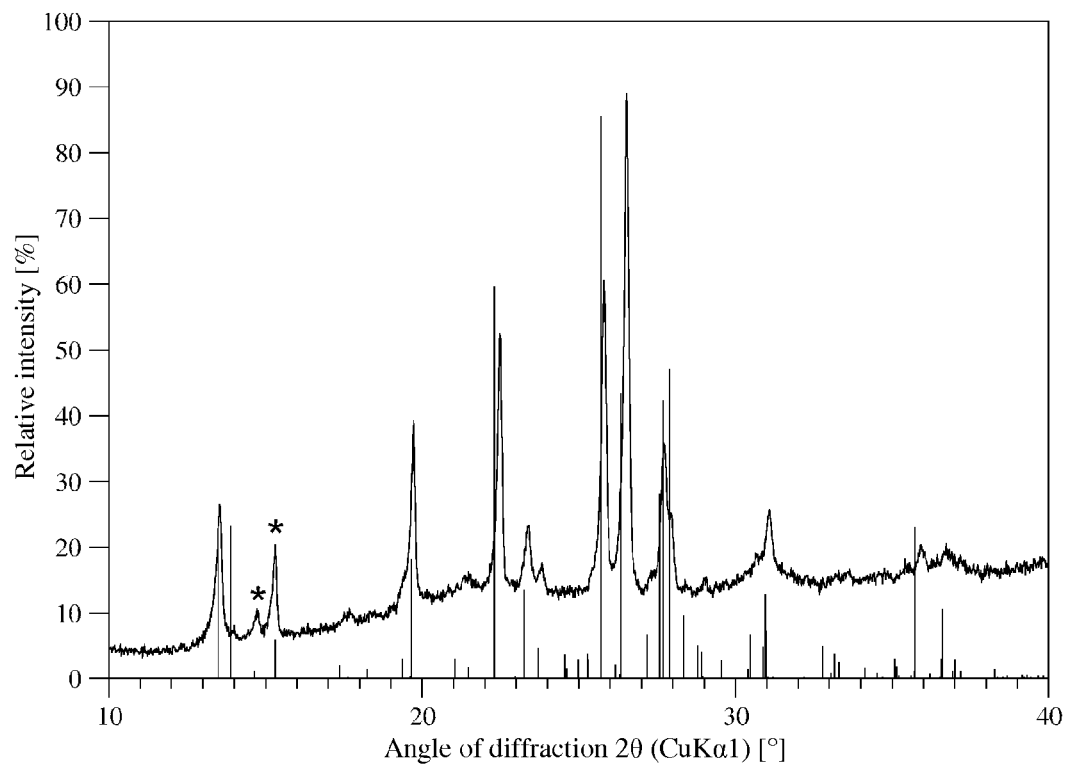
FIG. 21 shows the measured powder diffractogram of a Zn-phosphate-based mordenite with a pronounced texture effect (see, for example, the reflexes marked with asterisk). The transversal lines designate the position of the Bragg reflexes of a standard mordenite with a framework composition of $[(Al,Si)_{48}O_{96}]$ (without cations or water molecules in the hollow spaces).
Figure 22:
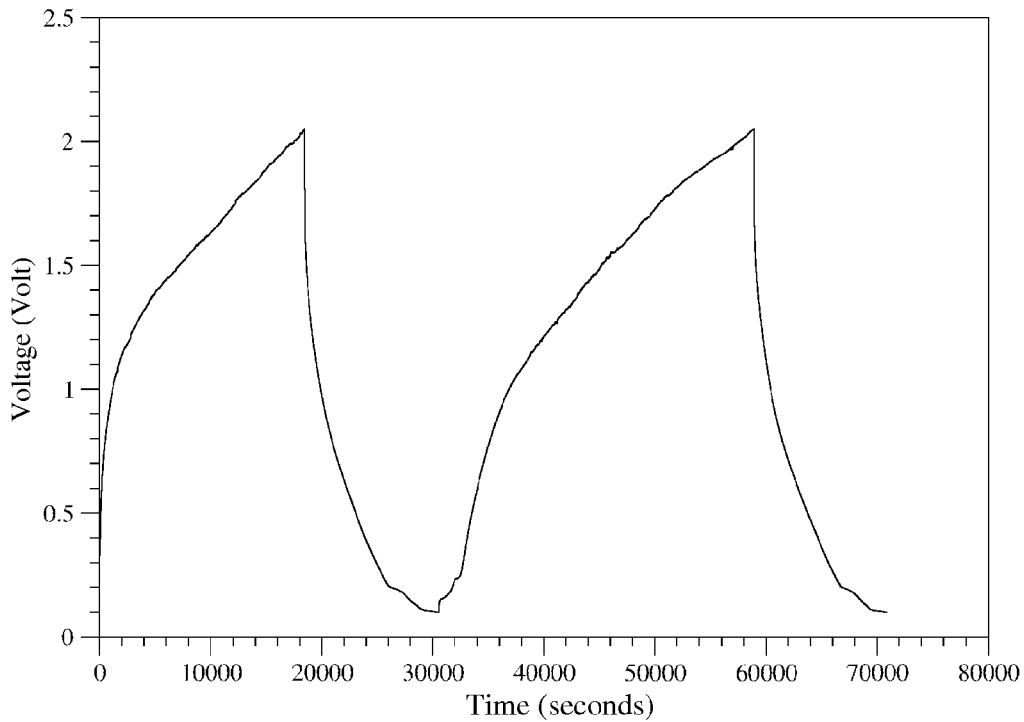
FIG. 22 shows the charging and discharging curves of two cycles, following one after the other (consisting of charging and discharging of the battery), of a lithium ion battery, according to the invention, with a heulandite cathode in the voltage range 0.05-2.05 V.
Figure 23:
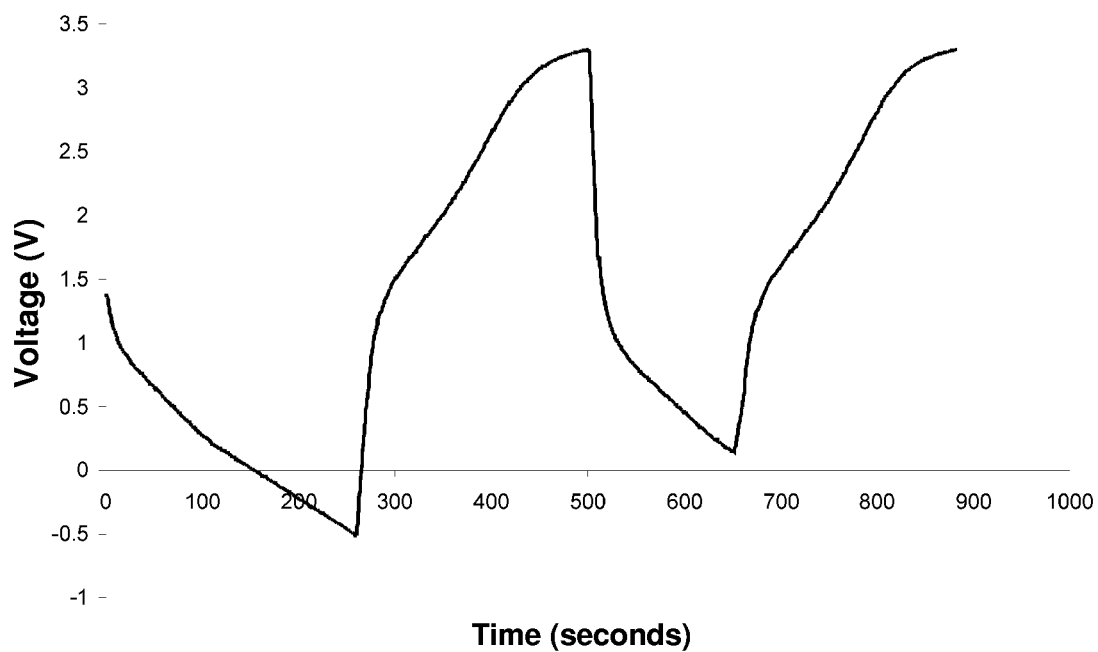
Figure 24:
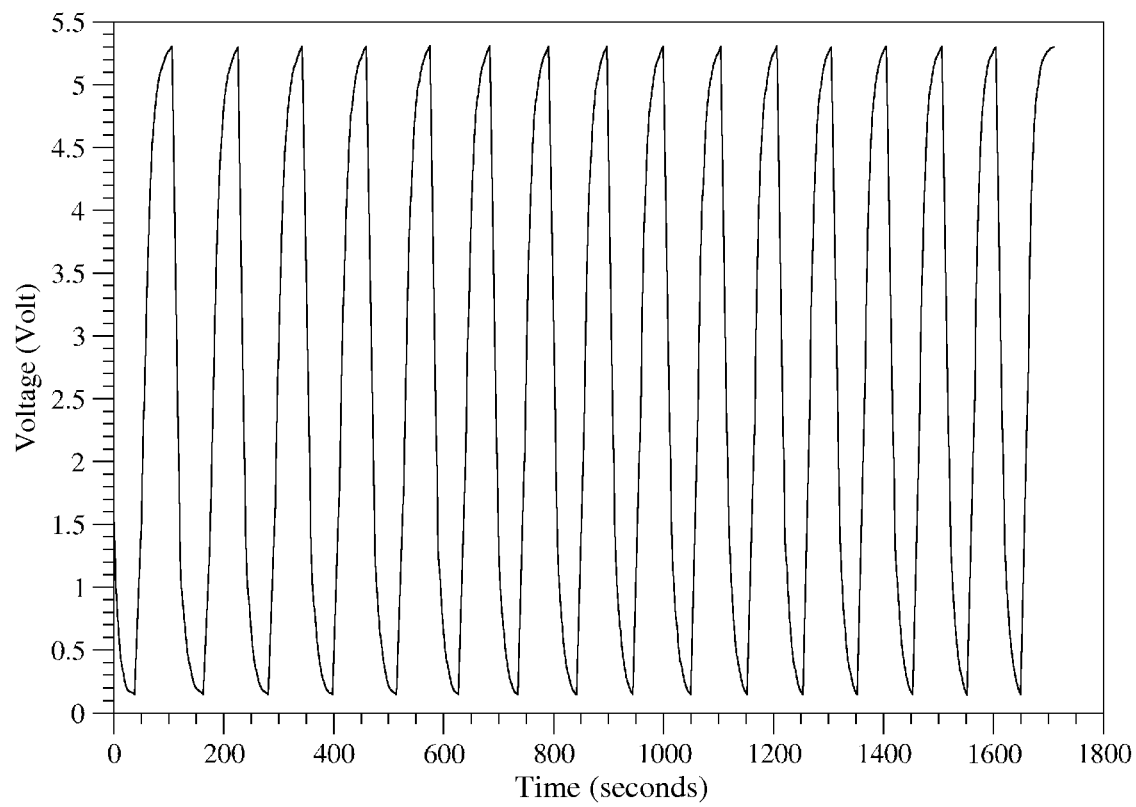
FIG. 24 shows the discharging and charging curve of 16 cycles, following one after the other (consisting of discharging and charging of the battery), of a lithium ion battery, according to the invention, with analcime cathode in the voltage range 0.14-5.31 V.
Figure 25:
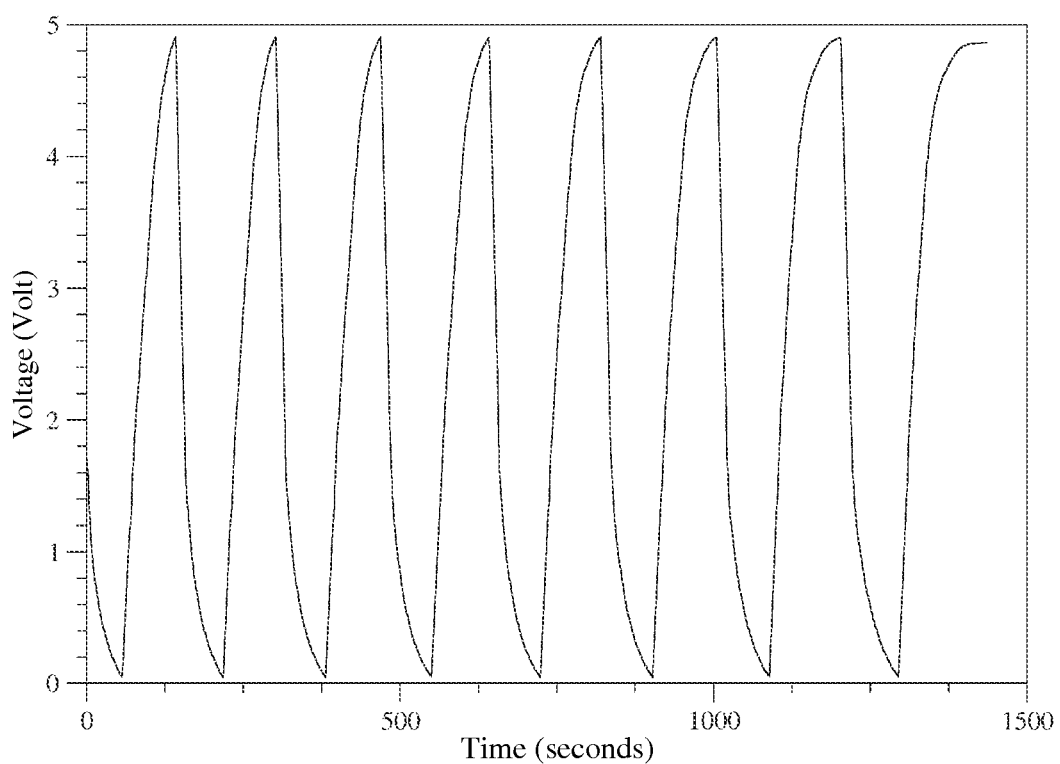
FIG. 25 shows the discharging and charging curve of 8 cycles, following one after the other (consisting of discharging and charging of the battery), of a lithium ion battery, according to the invention, with chabasite cathode in the voltage range 0.14-4.9 V.

A commercially available phosphatized steel sheet (thickness 0.5 mm, diameter 10 mm), which comprises a phosphatizing layer of hopeite on one surface, was used as a cathode without addition of graphite and binder in a lithium ion battery with the same principal setup as in Example 2. FIG. 20 shows the stable evolution of the discharging time, which is plotted as a function of the number of the discharging and charging cycles, of this battery in the course of several hundred cycles and demonstrates that a deep discharge in the range of 0.05 V-3.61 V has been achieved.

EXAMPLE 10

Figure 26:
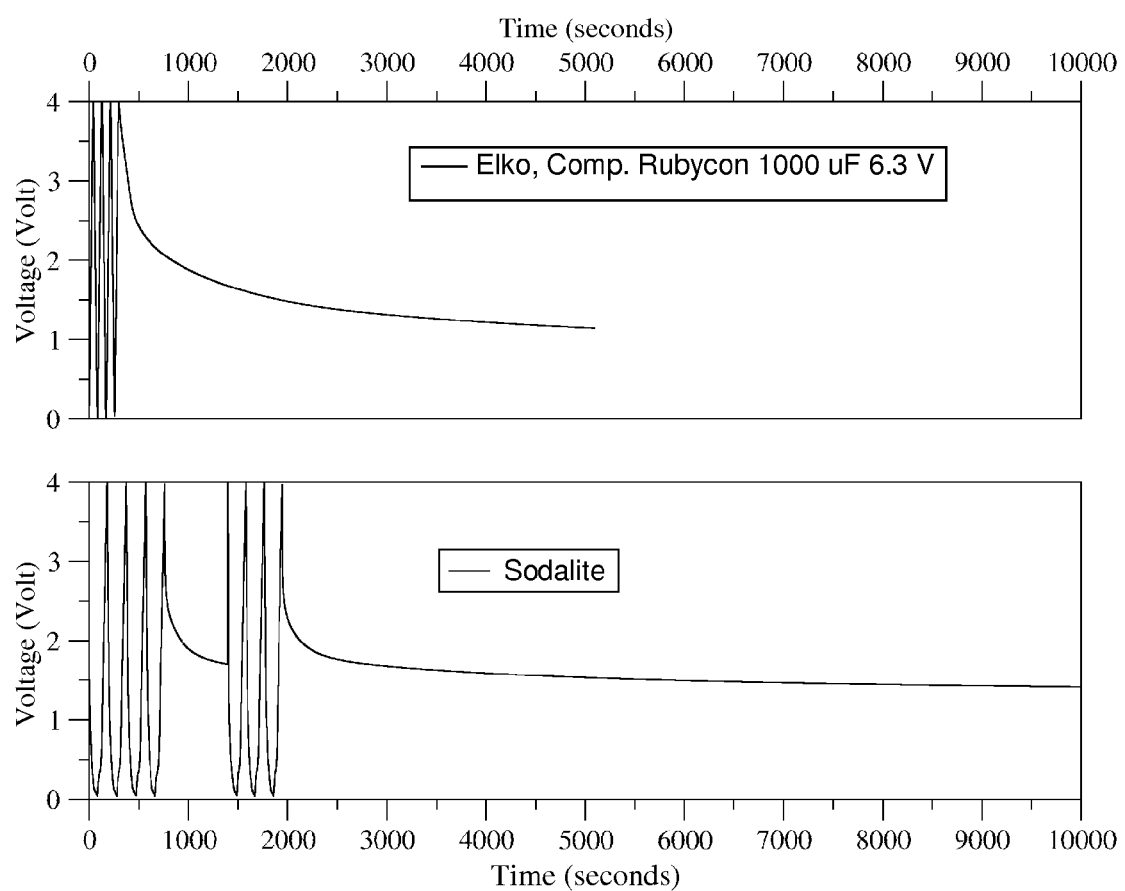
FIG. 26 shows the four cycles (consisting of discharging and charging) in the voltage range between 0.05-4.05 V and at an amperage of 1 mA in an electric storage unit, according to the invention, with an electrode of sodalite, which contains few redox centres, can be charged at more than 4 V and, in the process of discharging, first loses energy quickly as a capacitor, but then passes to a constant voltage level, as in the known lithium ion batteries. After the fourth charging, the measuring of the voltage drop started.

A zeolite with sodalite structure was charged, as in Example 2, with Li and was used as electrode in an electrochemical storage device with the same setup as in Example 2 (Chung, S.-Y. et al. in *Nature Mat.* 2002, 1, 123-128). FIG. 26 shows that this storage unit can be charged with high amperage (1 mA) to more than 4 V, like a capacitor. The discharge curve then shows first the strong self-discharging of a capacitor, but then passes into the constant voltage level of a battery.

The invention claimed is:

1. An electrochemical storage device comprising at least one electrode and a non-aqueous electrolyte, wherein the electrochemical storage device is capable of reaching a deep discharge of up to at least 0.05 V, and the electrode comprises a crystalline material with a structure which comprises at least
   a) 2 to 193 atom % structure-building ions M in a form of a lattice structure comprising $(MX_4)^{n-}$ -coordination polyhedrons, wherein M is at least one element of Groups 2-15 of the periodic table of elements,
   b) 8 to 772 atom % anions X in a form of a lattice structure comprising $(MX_4)^{n-}$ -coordination polyhedrons, wherein n is a number from 2-4, X is at least one element of Groups 16-17 of the periodic table of elements, and a portion of up to 25.01% of the anions X are optionally replaced by a halogenide ion,
   c) 0 to 5 atom % non-mobile structure-building cations of at least one element of Groups 3-13 of the periodic table of elements, and
   d) from greater than 0 to 46 atom % mobile cations, selected from elements of Group 1 or Group 11 of the periodic table of elements,
   wherein the structure has at least one channel that is free or is filled completely or partially with one or more species of the mobile cations, said at least one channel extending through an elementary cell of the structure, and wherein the structure comprises a hopeite lattice structure or a zeolite lattice structure selected from one of the following structures according to nomenclature of the International Zeolite Association (ZA): ABW ((BW)A-Li), ANA (Analcime), CAN (Cancrinite), CHA (Chabasite), ERI (Erionite), FAU (Faujasite), GIS (Gismondite), GME (Gmelinite), HEU (Heulandite), MOR (Mordenite), NAT (Natrolite), PHI (Phillipsite) and SOD (Sodalite).

2. The electrochemical storage device according to claim 1, which is a prismatic storage unit.

3. The electrochemical storage device according to claim 1, which is a secondary battery, and optionally a lithium ion storage unit.

4. A capacitor, comprising at least one electrode, which electrode comprises a crystalline material with a structure which comprises at least
   a) 2 to 193 atom % structure-building ions M in a form of a lattice structure comprising $(MX_4)^{n-}$ -coordination polyhedrons, wherein M is at least one element of Groups 2-15 of the periodic table of elements,
   b) 8 to 772 atom % anions X in a form of a lattice structure comprising $(MX_4)^{n-}$ -coordination polyhedrons, wherein n is a number from 2-4, X is at least one element of Groups 16-17 of the periodic table of elements, and a portion of up to 25.01% of the anions X are optionally replaced by a halogenide ion,
   c) 0 to 5 atom % non-mobile structure-building cations of at least one element of Groups 3-13 of the periodic table of elements, and
   d) from greater than 0 to 46 atom % mobile cations, selected from elements of Group 1 or Group 11 of the periodic table of elements,
   wherein the structure has at least one channel that is free or is filled completely or partially with one or more species of the mobile cations, said at least one channel extending through an elementary cell of the structure, and wherein the structure comprises a hopeite lattice structure or a zeolite lattice structure selected from one of the following structures according to nomenclature of the International Zeolite Association (ZA): ABW ((BW)A-Li), ANA (Analcime), CAN (Cancrinite), CHA (Chabasite), ERI (Erionite), FAU (Faujasite), GIS (Gismondite), GME (Gmelinite), HEU (Heulandite) MOR (Mordenite), NAT (Natrolite), PHI (Phillipsite) and SOD (Sodalite),
   and further comprising a non-aqueous electrolyte.

5. The capacitor according to claim 4, which is a double-layer capacitor.

6. The capacitor according to claim 4, which is a lithium capacitor.

7. The capacitor according to claim 4, which is adapted to permit a maximum operating voltage of more than 2.5 V.

8. The capacitor according to claim 4, wherein the crystalline material is present as a single crystal or as an anisotropic microcrystalline or nanocrystalline material, in which the at least one channel is oriented in one direction in space.

9. The capacitor according to claim 4, wherein in the crystalline material the mobile cations are selected from the group consisting of Li, Na, K and Ag.

10. The capacitor according to claim 4, wherein in the crystalline material the non-mobile structure-building cations are selected from the group consisting of Zn, Mn, Fe, Co, Ni, Cr, V, Sc, Ti, Cu and Al.

11. The capacitor according to claim 4, wherein the crystalline material is present on an electronically conducting substrate material, which is selected from the group consisting of metals, metal alloys and electrically conducting plastics.

12. The capacitor according to claim 11, wherein the crystalline material is present without binding agents or filling agents on the substrate material.

* * * * *